US012772246B2

(12) United States Patent
Chen et al.

(10) Patent No.: US 12,772,246 B2
(45) Date of Patent: Oct. 20, 2026

(54) UPLINK TRANSMISSION METHOD AND DEVICE, AND READABLE STORAGE MEDIUM

(71) Applicant: VIVO MOBILE COMMUNICATION CO., LTD., Dongguan (CN)

(72) Inventors: Xiaohang Chen, Dongguan (CN); Xueming Pan, Dongguan (CN)

(73) Assignee: Vivo Mobile Communication Co., Ltd., Dongguan (CN)

(*) Notice: Subject to any disclaimer, the term of this patent is extended or adjusted under 35 U.S.C. 154(b) by 914 days.

(21) Appl. No.: 18/166,568

(22) Filed: Feb. 9, 2023

(65) Prior Publication Data

US 2023/0189276 A1 Jun. 15, 2023

Related U.S. Application Data

(63) Continuation of application No. PCT/CN2021/112660, filed on Aug. 16, 2021.

(30) Foreign Application Priority Data

Aug. 19, 2020 (CN) ........................ 202010839447.3

(51) Int. Cl.

*H04W 72/21* (2023.01)
*H04W 72/1268* (2023.01)
*H04W 72/566* (2023.01)

(52) U.S. Cl.

CPC ....... *H04W 72/21* (2023.01); *H04W 72/1268* (2013.01); *H04W 72/566* (2023.01)

(58) Field of Classification Search

CPC ............. H04W 72/21; H04W 72/1268; H04W 72/566; H04W 72/563; H04W 72/56; H04L 5/0053

See application file for complete search history.

(56) References Cited

U.S. PATENT DOCUMENTS 10,856,315 B2 12/2020 Yang et al.
2020/0053761 A1* 2/2020 Hosseini ............... H04W 72/56

(Continued)

FOREIGN PATENT DOCUMENTS

CN 110798291 A 2/2020
CN 110972286 A 4/2020

(Continued)

OTHER PUBLICATIONS

An overview of physical layer design for Ultra-Reliable Low-Latency Communications in 3GPP Release 15 and Release 16 (Year: 2020).*

(Continued)

*Primary Examiner* — Nizar N Sivji
(74) *Attorney, Agent, or Firm* — Harness, Dickey & Pierce, P.L.C.

(57) ABSTRACT

An uplink transmission method includes that in a case that a first channel overlaps a second channel in time, the second channel overlaps a third channel in time, and a priority corresponding to the third channel is higher than a priority corresponding to the first channel and a priority corresponding to the second channel, a terminal performs a first operation. The first operation includes: multiplexing first (Continued)

uplink control information on the third channel for transmission; or not multiplexing the first uplink control information on the third channel for transmission. The first uplink control information is uplink control information carried on the first channel.

11 Claims, 28 Drawing Sheets

(56) References Cited

U.S. PATENT DOCUMENTS

| | | | | |
|---|---|---|---|---|
| 2020/0374860 | A1* | 11/2020 | Panteleev | H04L 5/0044 |
| 2021/0307046 | A1 | 9/2021 | Gou et al. | |
| 2021/0321394 | A1 | 10/2021 | Li et al. | |
| 2022/0086866 | A1* | 3/2022 | Hosseini | H04W 72/56 |
| 2023/0046263 | A1* | 2/2023 | Wong | H04W 72/569 |
| 2024/0340901 | A1* | 10/2024 | Shilov | H04W 24/08 |

FOREIGN PATENT DOCUMENTS

| | | | | |
|---|---|---|---|---|
| CN | 111066280 | A | 4/2020 | |
| CN | 111278143 | A | 6/2020 | |
| CN | 111314033 | A | 6/2020 | |
| WO | WO-2020041269 | A1 * | 2/2020 | H04L 5/001 |
| WO | WO-2020073283 | A1 * | 4/2020 | H04L 1/1861 |

OTHER PUBLICATIONS

3GPP TSG RAN WG1 Meeting #102-e R1-2006340 e-Meeting, Aug. 17-28, 2020 (Year: 2020).*
WO_2019194660_A1 (Year: 2019).*
WO_2020025045_A1 (Year: 2019).*
3GPP TSG RAN WGI # 102-e e-Meeting Aug. 17, 2020 Title Enhanced on intra-UE multiplexing/prioritization Document No. R1-2006061 (Year: 2020).*
WO_2021206448_A1 (Year: 2020).*
International Search Report and Written Opinion of the International Searching Authority regarding International Patent Application No. PCT/CN2021/112660, dated Nov. 10, 2021. Translation provided by Bohui Intellectual Property.
"Enhancements on intra-UE multiplexing/prioritization," OPPO, 3GPP TSG RAN WG1 #102-e, R1-2006061, dated Aug. 28, 2020.
"On Rel-17 UL intra-UE prioritization and multiplexing enhancements of traffic with different priorities," Nokia, 3GPP TSR RAN WG1 Meeting #102-e, R1-2006340, dated Aug. 28, 2020.
First Chinese Office Action regarding Chinese Patent Application No. 202010839447.3, dated Jul. 12, 2022. Translation provided by Bohui Intellectual Property.

* cited by examiner

501

In a case that a first channel overlaps a second channel in time, the second channel overlaps a third channel in time, and a priority corresponding to the third channel is higher than a priority corresponding to the first channel and a priority corresponding to the second channel, perform a first operation by a terminal.

UPLINK TRANSMISSION METHOD AND DEVICE, AND READABLE STORAGE MEDIUM

CROSS-REFERENCE TO RELATED APPLICATIONS

This application is a Bypass Continuation Application of PCT/CN2021/112660 filed on Aug. 16, 2021, which claims priority to Chinese Patent Application No. 202010839447.3 filed on Aug. 19, 2020, which are incorporated herein by reference in their entirety.

TECHNICAL FIELD

This application relates to the field of communications technologies, and in particular, to an uplink transmission method, a device, and a readable storage medium.

BACKGROUND

Compared with the previous mobile communication systems, mobile communication systems of future fifth-generation (5G) mobile communication technologies need to adapt to more diverse scenarios and service requirements. Main scenarios of new radio (NR) include: enhanced mobile broadband (eMBB), massive machine type communication (mMTC), and ultra-reliable and low latency communication (URLLC). These scenarios have different requirements for the systems in terms of high reliability, low latency, large bandwidth, wide coverage, and the like.

These different services have different requirements of quality of service (QoS). For example, UR LLC supports low latency and highly reliable services. Higher reliability needs to use a lower bit rate to transmit data, and requires a feedback of faster and more accurate channel state information (CSI). The eMBB service has the requirement of a high throughput, but is less sensitive to latency and reliability than URLLC. In addition, some terminals (such as user equipment (UE)) may support services with different numerology configurations. The UE supports both URLLC low latency and high reliability services, as well as high-capacity and high-speed eMBB services.

SUMMARY

According to a first aspect, an uplink transmission method is provided and includes: that in a case that a first channel overlaps a second channel in time, the second channel overlaps a third channel in time, and a priority corresponding to the third channel is higher than a priority corresponding to the first channel and a priority corresponding to the second channel, a terminal performs a first operation.

The first operation includes: multiplexing first uplink control information on the third channel for transmission; or not multiplexing the first uplink control information on the third channel for transmission.

The first uplink control information is uplink control information carried on the first channel.

According to a second aspect, an uplink transmission apparatus is provided and includes: a processing module, configured to, in a case that a first channel overlaps a second channel in time, the second channel overlaps a third channel in time, and a priority corresponding to the third channel is higher than a priority corresponding to the first channel and a priority corresponding to the second channel, perform a first operation.

The first operation includes: multiplexing first uplink control information on the third channel for transmission; or not multiplexing the first uplink control information on the third channel for transmission.

The first uplink control information is uplink control information carried on the first channel.

According to a third aspect, a terminal is provided, including a processor, a memory, and a program stored in the memory and executable on the processor, where when the program is executed by the processor, the steps of the method according to the first aspect are implemented.

According to a fourth aspect, a non-transitory computer-readable storage medium is provided, where the non-transitory computer-readable storage medium stores a program or an instruction, and when the program or the instruction is executed by a processor, the steps of the method according to the first aspect are implemented.

According to a fifth aspect, a program product is provided, where the program product is stored in a non-volatile storage medium, and the program product is executed by at least one processor, to implement the steps of the processing method according to the first aspect.

According to a sixth aspect, a chip is provided, where the chip includes a processor and a communications interface, the communications interface is coupled to the processor, and the processor is configured to execute a program or an instruction, to implement the processing method according to the first aspect.

DESCRIPTION OF EMBODIMENTS

Figure 1:
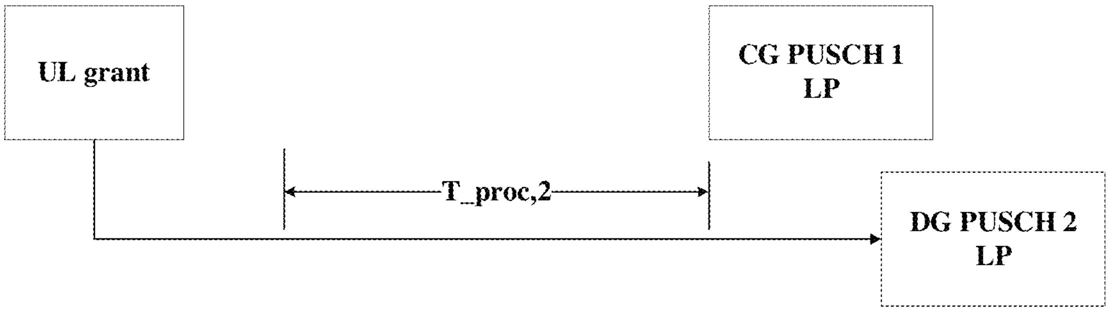
FIG. 1 is a first schematic diagram of limitation of a processing time on scheduling.

For ease of understanding of embodiments of this application, the following first describes technical terms:

(1) Unlicensed Band

In a future communications system, an unlicensed band may be used as a supplement to a licensed band to help an operator expand services. To be consistent with NR deployment and maximize an NR-based unlicensed access, the unlicensed band can work in bands of 5 GHz, 37 GHz, and 60 GHz. A large bandwidth (80 or 100 MHz) of the unlicensed band can reduce implementation complexity of a base station and a terminal. Because the unlicensed band is shared by various technologies (RATs), such as WiFi, a radar, and a long term evolution (LTE)-license assisted access (LAA), in some countries or regions, use of the unlicensed band must comply with regulations, such as listen before talk (LBT), maximum channel occupancy time (MCOT), and other regulations, to ensure that all devices can use such resource fairly. When a transmission node needs to send information and needs to perform LBT first, energy detection (ED) is performed on surrounding nodes. When detected energy is lower than a threshold, a channel is considered to be idle, and the transmission node can perform sending. Otherwise, it is considered that the channel is busy, and the transmission node cannot perform sending. The transmission node may be a base station, a terminal, a wireless hotspot (WiFi AP), and the like. After the transmission node starts transmitting, channel occupancy time (COT) cannot exceed MCOT.

(2) Hybrid Automatic Repeat Request Acknowledgement (HARQ-ACK) Codebook

For a HARQ-ACK process that supports TB level feedback, each transport block (TB) corresponds to a feedback HARQ-ACK bit, supports a plurality of downlink (DL) HARQ processes for each UE, and also supports a single DL HARQ process for each UE. The UE needs to indicate its capacity for minimum HARQ processing time (minimum HARQ processing time means minimum time required to receive the corresponding HARQ-ACK transmission timing from downlink data). EMBB and URLLC support asynchronous and adaptive DL HARQ. From a perspective of UE, a HARQ-ACK feedback of a plurality of physical downlink shared channels (PDSCH) can be transmitted in an uplink (UL) data/a control area in time, forming a HARQ-ACK codebook on this UL. In downlink control information (DCI), timing between acknowledgement (ACK)/negative acknowledgement (NACK) received by a PDSCH and acknowledgement (ACK)/negative acknowledgement (NACK) corresponding to the PDSCH (refer to the PDCSCH-to-HARQ timing indicator in DCI 1_0 and DCI 11) is specified.

In release 15 (R15), two types of HARQ-ACK codebook are supported: type-1: semi-static HARQ-ACK codebook; and type-2: dynamic HARQ-ACK codebook. For a semi-static HARQ-ACK codebook, the UE determines all PDSCHs that may be fed back in a slot and the HARQ-ACK codebook based on a monitoring occasion (PDCCH monitoring occasion) of a physical downlink control channel (PDCCH) configured by the radio resource control (RRC), PDSCH-Time Domain Resource Allocation, PDSCH-to-HARQ-ACK feedback timing (DL-Data To UL-ACK or PDSCH-to HARQ timing) and other parameters. Because a HARQ for an actually scheduled PDSCH and PDSCH for scheduling might be included, the codebook is generally large. For a dynamic HARQ-ACK codebook, the UE determines the HARQ-ACK codebook based on the actually scheduled PDSCH. Because only the actually scheduled PDSCH is fed back, a size of the HARQ-ACK codebook is usually smaller than a size of the semi-static HARQ-ACK codebook. A type of codebook used by the UE is determined by RRC configuration.

(3) Methods of Determining a PUCCH Resource

In R15, a base station can configure one or more (up to 4) PUCCH resource sets for each UE through RRC signaling. The RRC configures or predefines a maximum quantity of bits of UCI payload that each resource set (RESET) can carry (for example, the first RESET can carry up to 2 bits, the second and third RESET can carry up to N1 and N2, the fourth RESET can carry up to 1,706 bits, and N1 and N2 are RRC configuration). Each RESET can contain a plurality of PUCCH resources (the first RESET contain up to 32 PUCCH resources, and another RESET can contain up to 8 PUCCH resources). On a UE side, the UE needs to feed back the HARQ-ACK after receiving the PDSCH. To determine the PUCCH resource where the HARQ-ACK is fed back, the UE needs to first determine a slot where the PUCCH is located by scheduling K1 in the PDCCH of the PDSCH, and then determine the RESET where the PUCCH is located through the bit quantity of the to-be-fed back HARQ-ACK, and in the determined RESET, determine the PUCCH resource in the RESET (in a case that the RESET contains more than 8 resources) based on a PUCCH resource indicator (PRI) field of the PDCCH (in a case that the RESET contains no more than 8 resources) or an index of a first control channel element (CCE) of the PRI+the PDCCH (first CCE index). When a HARQ-ACK of a plurality of PDSCHs is fed back in one slot, the UE determines the PUCCH resource based on scheduling the PRI and a CCE index in the last DCI of these PDSCHs.

(4) PDSCH Processing Time

The UE accepts and indicates K1 value (slot granularity) in the scheduling PDSCH, that is, the slot where the PUCCH corresponding to the scheduling PDSCH is located, and in combination with the PRI indication in the DCI, decodes a CCE index of a PDCCH of the DCI and the PUCCH transmission size to select a PUCCH resource based on a protocol rule.

In addition, time between a symbol L where the first symbol of the PUCCH resource is located after adjustment is performed on a tracking area (TA) and the last symbol of a PDSCH corresponding to the symbol L needs to satisfy the following timeline $T_{proc,1}$:

$$T_{proc,1}=(N_1+d_{1,1})(2048+144)\cdot\kappa 2^{-\mu}\cdot T_c$$

N1 is related to whether there is an additional DMRS based on different UE capabilities, as shown in Table 1 and Table 2.

TABLE 1

| PDSCH processing time of PDSCH processing capacity 1 | | |
|---|---|---|
| μ | PDSCH decoding time N1 [symbols] dmrs-AdditionalPosition = pos0 in DMRS-DownlinkConfig in both of dmrs-DownlinkForPDSCH-MappingTypeA, dmrs-DownlinkForPDSCH-Mapping TypeB | dmrs-AdditionalPosition # pos0 in DMRS-DownlinkConfig in either of dmrs-DownlinkForPDSCH-MappingType A, dmrs-DownlinkForPDSCH-MappingTypeB or if the higher layer parameter is not configured |
| 0 | 8 | N1,0 |
| 1 | 10 | 13 |
| 2 | 17 | 20 |
| 3 | 20 | 24 |

TABLE 2

| PDSCH processing time of PDSCH processing capacity 1 | |
|---|---|
| μ | PDSCH decoding time N1 [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
| 0 | 3 |
| 1 | 4.5 |
| 2 | for Frequency range 1 (FR1), 9 |

Corresponding to (sub-carrier spacing (SCS) of a PDCCH that schedules the PDSCH, SCS of a scheduling PDSCH, and SCS of an UL channel where the PUCCH transmitted by a HARQ-ACK is located), different values of $T_{proc,1}$ are calculated, and N1 and SCS corresponding to the maximum value of $T_{proc,1}$ are taken;

When $1_1$=12, N1,0=14; otherwise N1,0=13.

When the UE is configured with a plurality of component carriers (CC), the TA needs to consider a plurality of carriers.

d1,1 is related to a type and a length of the PDSCH, and a quantity of symbols overlapping the PDCCH.

(5) Physical Layer PUSCH Scheduling Time

A time interval between an end symbol of the PDCCH that schedules the PUSCH and a start symbol of the PUSCH is at least $T_{proc,2}=\max((N_2+D_{2,1})(2048+144)\cdot\kappa 2^{-\mu}\cdot T_c, d_{2,2})$.

N2 is based on μ. Table 3 and Table 4 below show UE processing capacity 1 and 2.

If the first symbol of the PUSCH is only composed of DM-RSs, $d_{2,1}=0$; otherwise $d_{2,1}=1$.

If the scheduling DCI triggers a handover of a bandwidth part (BWP), $d_{2,2}$ is equal to a handover time; otherwise $d_{2,2}=0$.

TABLE 3

| Preparation time 1 of PUSCH timing capability | |
|---|---|
| μ | PUSCH preparation time N2 [symbols] |
| 0 | 10 |
| 1 | 12 |
| 2 | 23 |
| 3 | 36 |

TABLE 4

| Preparation time 2 of PUSCH timing capability | |
|---|---|
| μ | PUSCH preparation time N2 [symbols] |
| 0 | 5 |
| 1 | 5.5 |
| 2 | for Frequency range 1, 11 |

(6) Physical Layer UCI Multiplexing Time

In a case that a single slot PUCCH overlaps a single slot PUCCH or PUSCH, the UE uses an existing multiplexing rule to multiplex all pieces of UCI on one PUCCH or PUSCH. If a plurality of PUSCHs/PUCCHs overlap, a time interval between the last symbol of any PDSCH to a start symbol of the earliest PUCCH/PUSCH in the overlapping PUCCH/PUSCH is $$T^{mux}_{proc,1}\cdot\ T^{mux}_{proc,1}$$

is the maximum processing time of all PDSCHs, that is $$T^{mux}_{proc,1}=\max\{T^{mux,1}_{proc,1},\ \ldots\ ,T^{mux,i}_{proc,1},\ \ldots\ \}.$$

The processing time of the $i_{th}$ PDSCH is:

$$T^{mux,i}_{proc,1}=(N_1+d_{1,1}+1)\cdot(2048+144)\cdot\kappa\cdot 2^{-\mu}\cdot T_C$$

$d_{1,1}$ is related to DMRS configuration, and PDCCH and PDSCH configuration.

Similarly, a time interval between the last symbol of any PDCCH and a start symbol of the earliest PUCCH/PUSCH in the overlapping PUCCH/PUSCH is $$T^{mux}_{proc,2}\cdot\ T^{mux}_{proc,2}$$

is the maximum value of the processing time of all PUSCHs, that is $$T^{mux}_{proc,2}=\max\{T^{mux,1}_{proc,2},\ \ldots\ ,T^{mux,i}_{proc,2},\ \ldots\ \}.$$

The processing time of the $i_{th}$ PUSCH is:

$$T_{proc,2}^{mux,i} = \max((N_2 + d_{2,1} + 1) \cdot (2048 + 144) \cdot \kappa \cdot 2^{-\mu} \cdot T_C, d_{2,2})$$

(7) Processing Time N3

NR R15 introduces a scheduling and HARQ time limitation, that is, N3. The definition is as follows.

If UE receives a first PDCCH indicating that a first PUCCH of the UE in one slot feeds back a HARQ-ACK, the UE, after the first PDCCH, receives a second PDCCH also indicating that the UE feeds back a HARQ-ACK in the slot, and the PUCCH resource that feeds back the HARQ-ACK is a second PUCCH, an interval between an end symbol position of the second PDCCH and a start symbol position of the first PUCCH is greater than or equal to $N_3 \cdot (2048+144) \cdot \kappa \cdot 2^{-\mu} \cdot T_c$. $N_3$ is related to sub-carrier spacing and UE capability. If a serving cell where the second PDCCH is located and all serving cells of a PUCCH of the slot to which the HARQ-ACK is multiplexed are configured with PDSCH processing capability 2, values of N3 is $N_3=3$ corresponding to $\mu=0$ $N_3=4.5$ corresponding to $\mu=1$, and $N_3=9$ corresponding to $\mu=2$, that is, the UE takes the values based on N1 of the PDSCH processing capability 2. Otherwise, the values of $N_3$ is $N_3=8$ corresponding to $\mu=0$ $N_3=10$ corresponding to $\mu=1$, $N_3=17$ corresponding to $\mu=2$ $N_3=20$ corresponding to $\mu=3$, that is, the values of N3 take value based on values of N1 of PDSCH processing capacity 1.

(8) Limitation of a Processing Time on Scheduling

Referring to FIG. 1, if a configured grant (CG) PUSCH overlaps a dynamic grant (DG) PUSCH in time. The DG PUSCH and the CG PUSCH have the same physical layer priority. The DG PUSCH has priority over the CG PUSCH, that is, UE sends the DG PUSCH and does not send the CG PUSCH. In this case, a certain condition needs to be met. A time interval between a receiving moment of UL grant of a scheduling DG PUSCH and a start moment of the CG PUSCH is greater than or equal to $T_{proc,2}$. $T_{proc,2}$ is a preparation time of the PUSCH.

Figure 2:
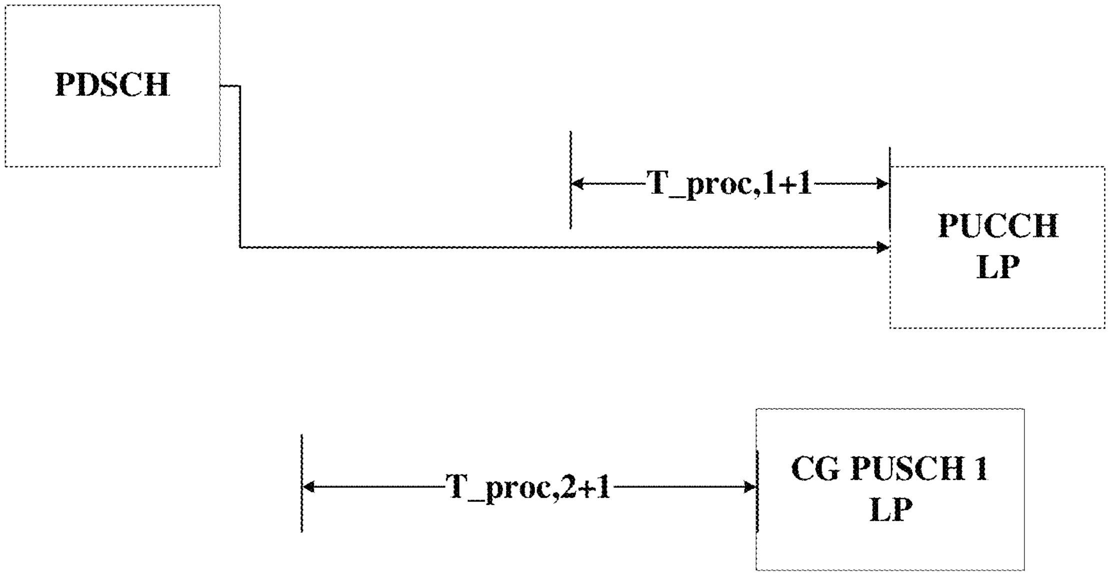
FIG. 2 is a second schematic diagram of limitation of a processing time on scheduling.

As shown in FIG. 2, if a low priority (LP) CG PUSCH overlaps a high priority (HP) DG PUSCH in time, the DG PUSCH has priority over the CG PUSCH, that is, UE sends the DG PUSCH and cancels all transmission of the CG PUSCH. In this case, a certain condition needs to be met. A time interval between a receiving moment of UL grant of a scheduling DG PUSCH and a start moment of the CG PUSCH is greater than or equal to $T_{proc,2}$+d1, that is, cancellation time of uplink transmissions with different priorities. It should be noted that a start moment of UL grant and a DG PUSCH 2 need to be greater than or equal to $T_{proc,2}$+d2.

The start moment can be understood as a start position of a time domain, such as a start position of a slot (start slot for short), or a start position of a symbol (start symbol for short).

Figure 3:
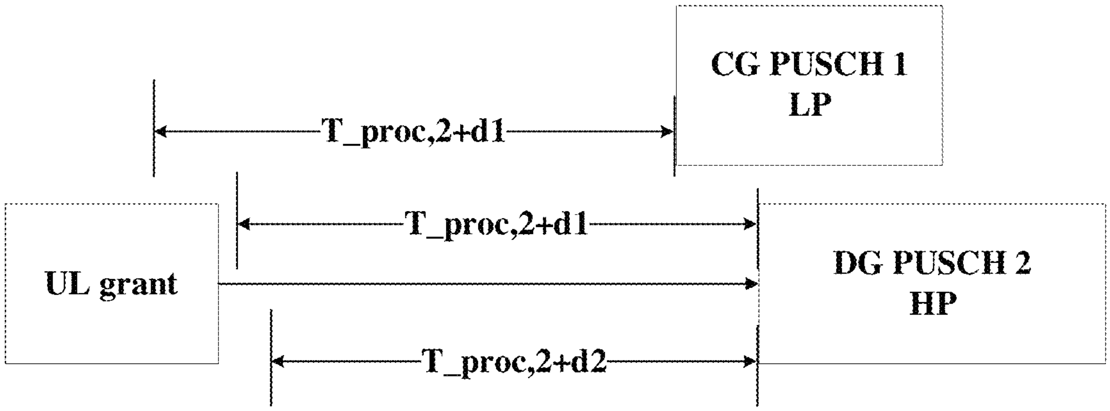
FIG. 3 is a third schematic diagram of limitation of a processing time on scheduling.

As shown in FIG. 3, if one LP CG PUSCH overlaps one HP DG PUSCH in time, the DG PUSCH has priority over the CG PUSCH, that is, the UE sends the DG PUSCH, and the UE cancels (part of) transmission of a CG PUSCH 1 in a case that the CG PUSCH 1 overlaps with the DG PUSCH 2. In this case, a certain condition needs to be met. The time interval between the receiving moment of UL grant of the scheduling DG PUSCH and a start moment of the DG PUSCH 2 is greater than or equal to $T_{proc,2}$+d1. However, a time interval between the receiving moment of UL grant of the scheduling DG PUSCH and the start moment of CG PUSCH is smaller than $T_{proc,2}$+d1. It should be noted that the start moment of the UL grant and the DG PUSCH 2 need to be greater than or equal to $T_{proc,2}$+d2.

The receiving moment can be understood as a start or end position of a time domain, such as a start or end position of a slot (start or end slot for short), or a start or end position of a symbol (start or end symbol for short).

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way is interchangeable in appropriate circumstances, so that the embodiments of this application can be implemented in other orders than the order illustrated or described herein. In addition, objects distinguished by "first" and "second" are usually of one category, and a quantity of objects is not limited. For example, a first object may mean one or more objects. The term "and/or" in this specification describes only an association relationship for describing associated objects and represents that three relationships may exist. For example, A and/or B may represent the following three cases: only A exists, both A and B exist, and only B exists. In addition, "and" in the specification and claims represents at least one of connected objects. Symbol "/" in the specification generally represents an "or" relationship between associated objects.

It should be noted that the technologies described in the embodiments of this application are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application may be used interchangeably. The described technologies can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a 6-th generation (6G) communications system.

Figures 4, 5:
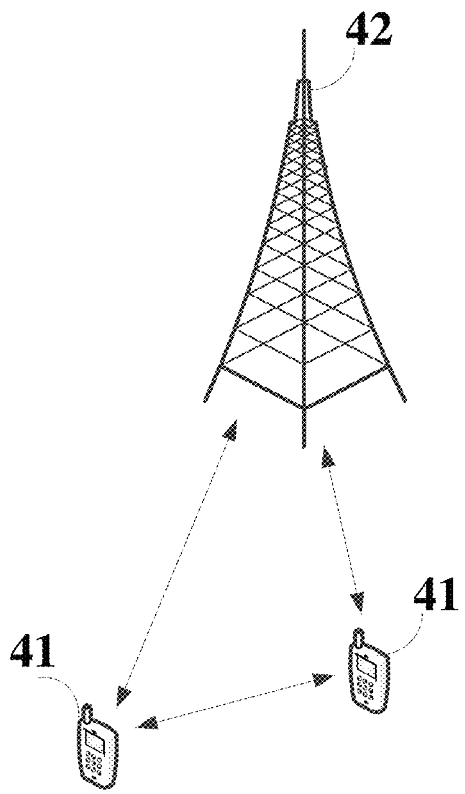
FIG. 4 is a block diagram of a wireless communications system to which an embodiment of this application is applicable.
FIG. 5 is a schematic diagram of an uplink transmission method according to an embodiment of this application.

FIG. 4 is a block diagram of a wireless communications system to which an embodiment of this application can be applied. The wireless communications system includes a terminal 41 and a network-side device 42. The terminal 41 may also be referred to as a terminal device or user equipment (UE). The terminal 41 may be a terminal device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), and pedestrian user equipment (PUE). The wearable device includes a bracelet, a headset, and glasses. It should be noted that a type of the terminal 41 is not limited in this embodiment of this application. The network-side device 42 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmitting receiving point (TRP), or some other appropriate term in the art. As long as the same technical effect is achieved, the base station is not limited to a specific technical term. It should be noted that the base station in the NR system is taken only as an example in the embodiments of this application, but a type of the base station is not limited.

The following describes the uplink transmission method, the device and the readable storage medium provided in the embodiments of this application through embodiments and application scenarios thereof with reference to the accompanying drawings.

Usually, when a plurality of physical uplink control channels (PUCCH) or physical uplink shared channels (PUSCH) with different priorities overlap in time, uplink control information (UCI) may be carried on the PUCCHs or PUSCHs with different priorities. However, in the existing methods, there is no clear definition of requirements for processing time of UCI being multiplexed to PUCCHs or PUSCHs with different priorities, and behaviors of the UE are unclear.

Referring to FIG. 5. an embodiment of this application provides an uplink transmission method, and the uplink transmission method includes Step 501.

Step 501: In a case that a first channel overlaps a second channel in time, the second channel overlaps a third channel in time, and a priority corresponding to the third channel is higher than a priority corresponding to the first channel and a priority corresponding to the second channel, a terminal performs a first operation.

The first operation may include: multiplexing first UCI on the third channel for transmission; or not multiplexing the first UCI on the third channel for transmission.

The first UCI is UCI carried on the first channel.

The overlapping in time may be a subframe, a slot, a sub-slot, a symbol, and the like.

In this embodiment of this application, a priority may refer to a priority of a PUCCH, a PDSCH, or a PUSCH, or a priority of UCI corresponding to a PUCCH. Alternatively, for the PUCCH, the PDSCH, or the PUCCH, a corresponding priority is a priority indicated by DCI, or a priority configured by radio resource control (RRC).

In an embodiment of this application, optionally, in a case that a first condition is met, the terminal performs the first operation.

The first condition includes one or more of:

(1) an interval between a first moment and a second moment is greater than or equal to a first time;

(2) the interval between the first moment and the second moment is smaller than a second time;

(3) an interval between the first moment and a third moment is greater than or equal to a third time;

(4) the interval between the first moment and the third moment is smaller than a fourth time;

(5) an interval between the first moment and a fourth moment is greater than or equal to a fifth time; or (6) an interval between a fifth moment and the second moment is greater than or equal to a sixth time.

The first moment (t1) is a receiving moment of a downlink control channel corresponding to the third channel, or a generation moment of a media access control protocol data unit (MAC PDU) corresponding to the third channel.

The second moment (t2) is a start moment of the first channel or a start moment of the second channel.

The third moment (t3) is a start moment of the second channel.

The fourth moment (t4) is a receiving moment of a downlink data channel corresponding to the first channel.

The fifth moment (t5) is the start moment of the first channel.

In an embodiment of this application, optionally, the first time or the second time includes: a first processing time (T1) and/or a second processing time (T2).

The third time or the fourth time includes: a third processing time (T3).

The fifth time includes: a fourth processing time (T4).

The sixth time includes: a fifth processing time (T5).

The first processing time, the second processing time, the third processing time, the fourth processing time, and/or the fifth processing time include any one of:

(1) a processing time of a physical downlink shared channel, for example, $T_{proc,1}$;

(2) a preparation time of a physical uplink shared channel, for example, $T_{proc,2}$;

(3) a cancellation time of uplink transmission, for example, $T_{proc,2}$+d1;

(4) a first multiplexing time, for example, $T_{proc,1}$+1;

(5) a second multiplexing time, for example, $T_{proc,2}$+1; or (6) a preparation time of a physical uplink control channel, for example, N3.

In the prior art, there is no clear definition of the processing time requirements for UCI multiplexed on a PUCCH or a PUSCH with different priorities. However, in the embodiments of this application, the processing time requirements for UCI multiplexed on a PUCCH or a PUSCH with different priorities are set. Based on different processing time requirements, a terminal can multiplex UCI on the PUCCH or the PUSCH with different priorities for transmission, to improve reliability of uplink transmission.

In an embodiment of this application, optionally, the first operation further includes: not expecting to meet or not meeting the first condition.

For example, the terminal does not expect that the interval between the first moment and the second moment is greater than or equal to the first time; the terminal does not expect that the interval between the first moment and the second moment is smaller than the second time; the terminal does not expect that the interval between the first moment and the third moment is greater than or equal to the third time; the terminal does not expect that the interval between the first moment and the third moment is smaller than the fourth time; the terminal does not expect that the interval between the first moment and the fourth moment is greater than or equal to the fifth time; or the terminal does not expect that the interval between the fifth moment and the second moment is greater than or equal to the sixth time.

For another example, the terminal does not expect that the interval between the first moment and the second moment is smaller than the first time; the terminal does not expect that the interval between the first moment and the second moment is greater than or equal to the second time; the terminal does not expect that the interval between the first moment and the third moment is smaller than the third time; the terminal does not expect that the interval between the first moment and the third moment is greater than or equal to the fourth time; the terminal does not expect that the interval between the first moment and the fourth moment is smaller than the fifth time; or the terminal does not expect that the interval between the fifth moment and the second moment is smaller than the sixth time.

In an embodiment of this application, optionally, the first channel overlaps or does not overlap the third channel in time.

In an embodiment of this application, optionally, not multiplexing the first uplink control information on the third channel for transmission includes one of:

(1) discarding the first uplink control information;

(2) transmitting the first uplink control information on the first channel; or (3) transmitting the first uplink control information on the second channel.

In an embodiment of this application, optionally, the second channel is a dynamic grant physical uplink shared control channel, or a configured grant physical uplink shared control channel. The third channel is a dynamic grant physical uplink shared control channel, a configured grant physical uplink shared control channel, or a physical uplink control channel.

In an embodiment of this application, optionally, the transmitting the first uplink control information on the second channel includes:

in a case that the third channel is a dynamic grant physical uplink shared control channel, transmitting the first uplink control information and second uplink control information on the second channel, where the second uplink control information is uplink control information carried on the dynamic grant physical uplink shared control channel.

In an embodiment of this application, optionally, in a case that the third channel is a dynamic grant physical uplink shared control channel, uplink control information carried on the dynamic grant physical uplink shared control channel is transmitted on the third channel.

In an embodiment of this application, optionally, the first operation further includes one or more of:

(1) canceling all or part of the transmission on the second channel, or transmitting the second channel; where optionally, starting from a moment at which the second channel overlaps the third channel, canceling all or part of the transmission of the second channel; or (2) canceling all or part of the transmission on the first channel, or transmitting the first channel.

For example, the first operation further includes: canceling all or part of transmission of the second channel and canceling all or part of transmission of the first channel; transmitting the first channel and canceling all or part of transmission of the second channel; transmitting the second channel and canceling all or part of transmission of the first channel; or transmitting the second channel and transmitting the first channel.

In this embodiment of this application, the terminal can multiplex the UCI on the PUCCH or the PUSCH with different priorities for transmission, to improve reliability of uplink transmission.

In this embodiment of this application, it is assumed that:

(1) All or part of the UCI information carried on a PUCCH-LP can be multiplexed on the PUSCH-LP or sent on a PUSCH-HP; and (2) All or part of the UCI information carried on the PUCCH-LP may be multiplexed with UCI information carried on PUCCH-HP.

Figure 6:
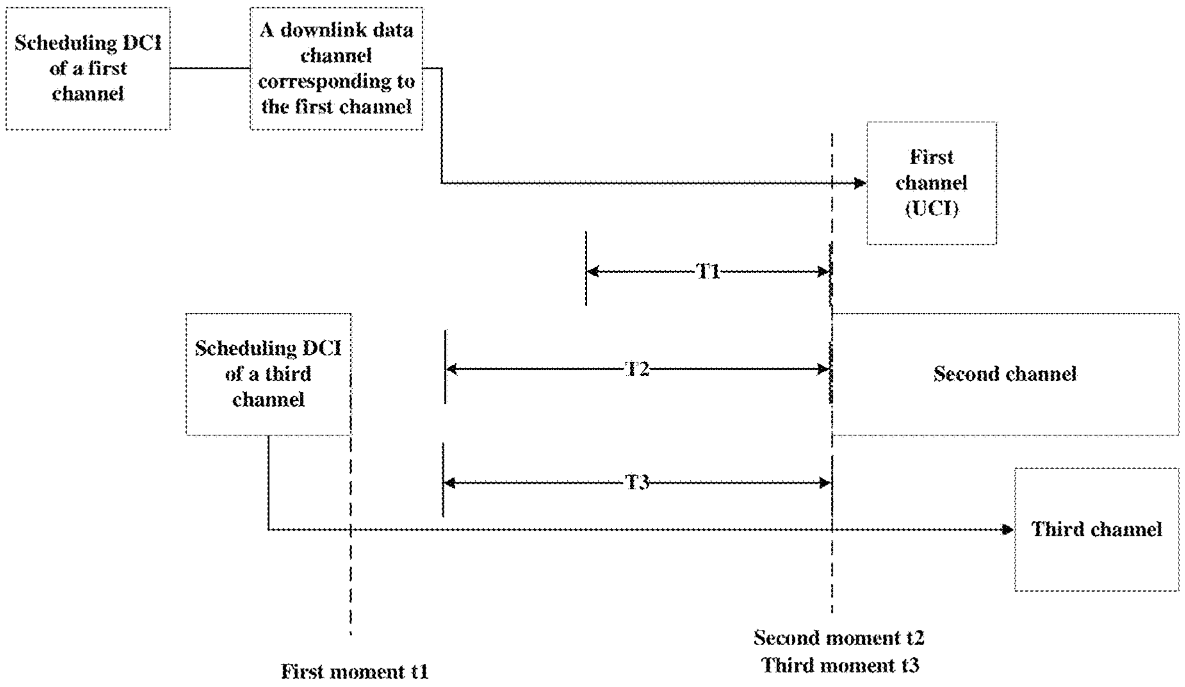
FIG. 6 is a schematic diagram of example 1 according to an embodiment of this application.

Example 1: Referring to FIG. 6, a first channel is a LP PUCCH, a second channel is a LP CG PUSCH, and a third channel is a HP DG PUSCH.

Example 1a

Figure 7:
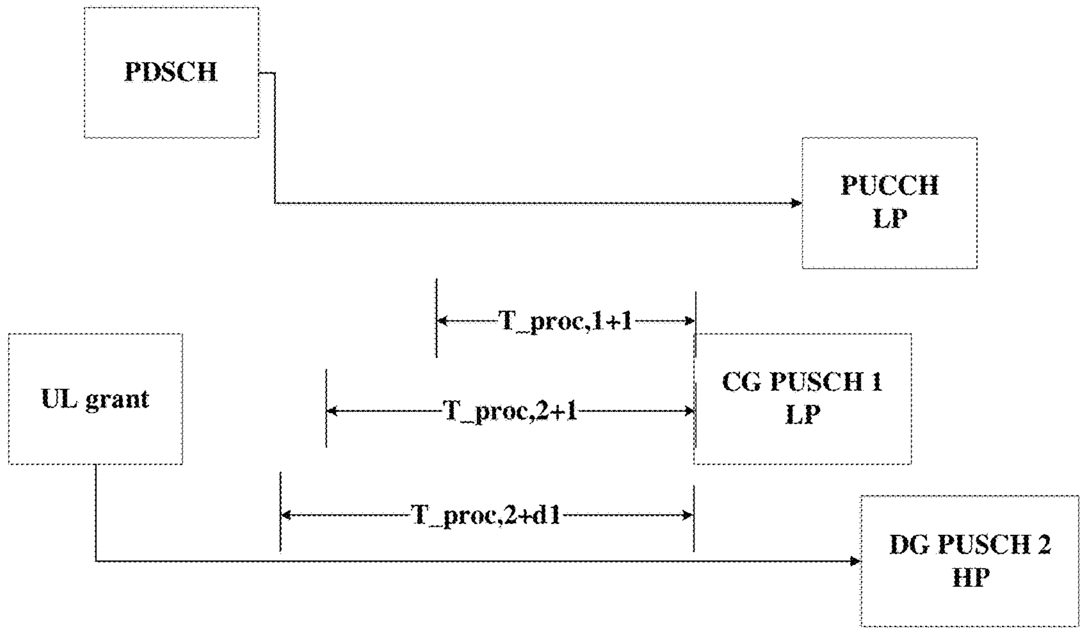
FIG. 7 to FIG. 8 are schematic diagrams of example 1a according to an embodiment of this application.

The LP PUCCH overlaps a LP CG PUSCH 1 in time, a CG PUSCH 1 overlaps a HP DG PUSCH 2 in time, and the LP PUCCH overlaps the HP DG PUSCH 2 in time. A time interval between a receiving moment of UL grant of a scheduling DG PUSCH 2 and a start moment of the CG PUSCH 1 is greater than or equal to $T_{proc,1}+1$ and greater than or equal to $T_{proc,2}+1$. In addition, a time interval between the receiving moment of the UL grant of the DG PUSCH 2 and the start moment of the CG PUSCH 1 is greater than or equal to $T_{proc,2}+d1$. Optionally, the time interval between the receiving moment of the UL grant of the DG PUSCH 2 and the start moment of the DG PUSCH 2 is greater than or equal to $T_{proc,2}+d1$ (FIG. 7).

Figure 8:
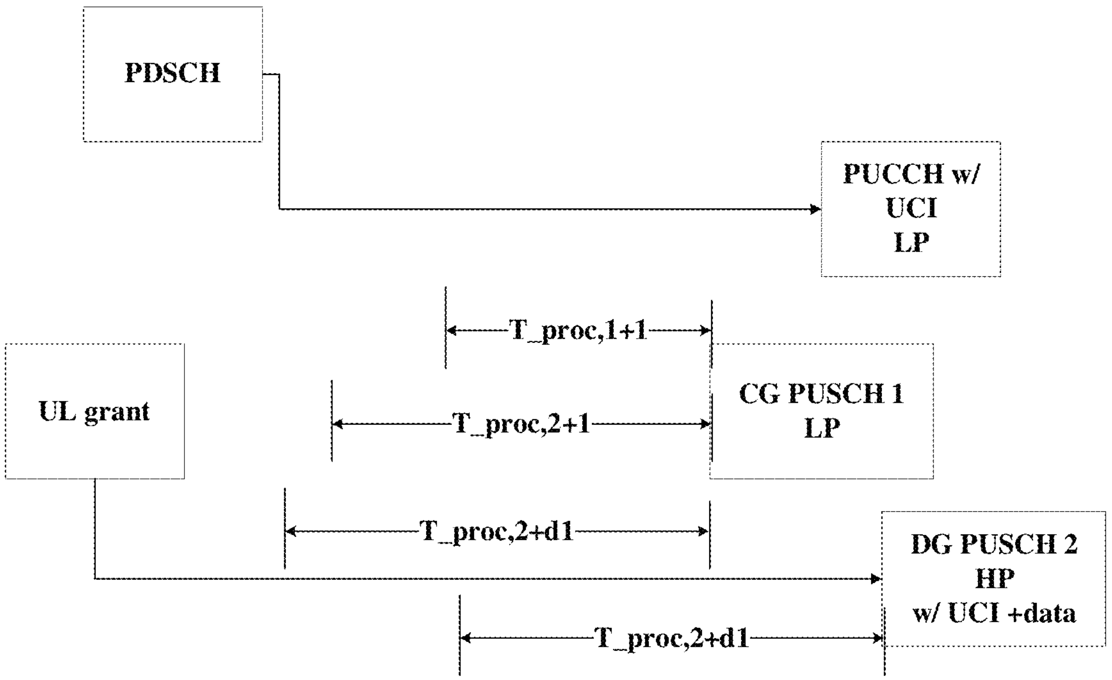

UE behavior: UCI carried on the LP PUCCH can be multiplexed and transmitted on the HP DG PUSCH 2 (FIG. 8).

Optionally, the UE cancels the transmission of the LP CG PUSCH 1.

Implementation 1

The UE first determines that the UCI carried on the LP PUCCH is multiplexed on the LP CG PUSCH 1, and then the UE receives the UL grant of the scheduling HP DG PUSCH 2. In this case, the UE determines that the LP CG PUSCH 1 overlaps the HP DG PUSCH in time. Because the interval between the receiving moment of UL grant and the starting of the CG PUSCH 1 is greater than or equal to $T_{proc,2}+1$ and $T_{proc,1}+1$, and greater than or equal to $T_{proc,2}+d1$, the CG PUSCH 1 has not yet started to prepare and can be canceled by the UE. The UCI has not been multiplexed to the CG PUSCH 1. Therefore, the UE can multiplex the UCI on the PUCCH that is supposed to be multiplexed on the CG PUSCH 1 on the HP DG PUSCH 2 for transmission.

Example 1a'

Figure 9:
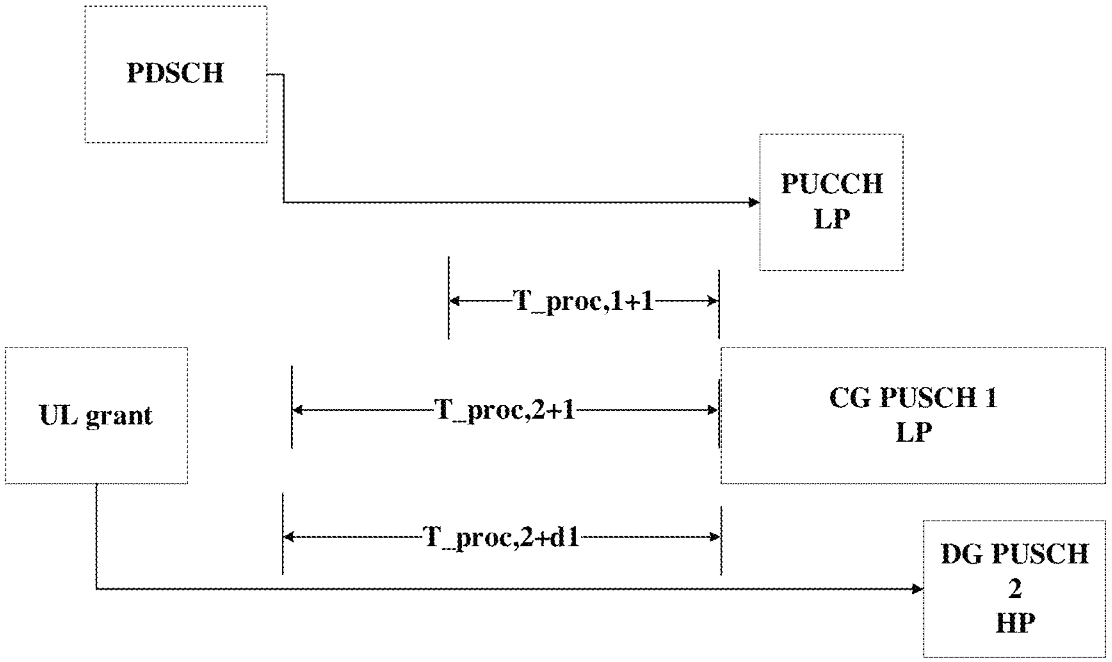
FIG. 9 to FIG. 10 are schematic diagrams of example 1a' according to an embodiment of this application.

The LP PUCCH overlaps the LP CG PUSCH 1 in time, the CG PUSCH 1 overlaps the HP DG PUSCH 2 in time. The LP PUCCH does not overlap the HP DG PUSCH 2 in time. The time interval between the receiving moment of UL grant of the DG PUSCH 2 and the start moment of the CG PUSCH 1 is greater than or equal to $T_{proc,1}+1$ and greater than or equal to $T_{proc,2}+1$, and the time interval between the receiving moment of UL grant of the DG PUSCH 2 and the start moment of the CG PUSCH 1 is greater than or equal to $T_{proc,2}+d1$. The time interval between the receiving moment of UL grant of the DG PUSCH 2 and the start moment of the DG PUSCH 1 is greater than or equal to $T_{proc,2}+d1$ (FIG. 9).

Figure 10:
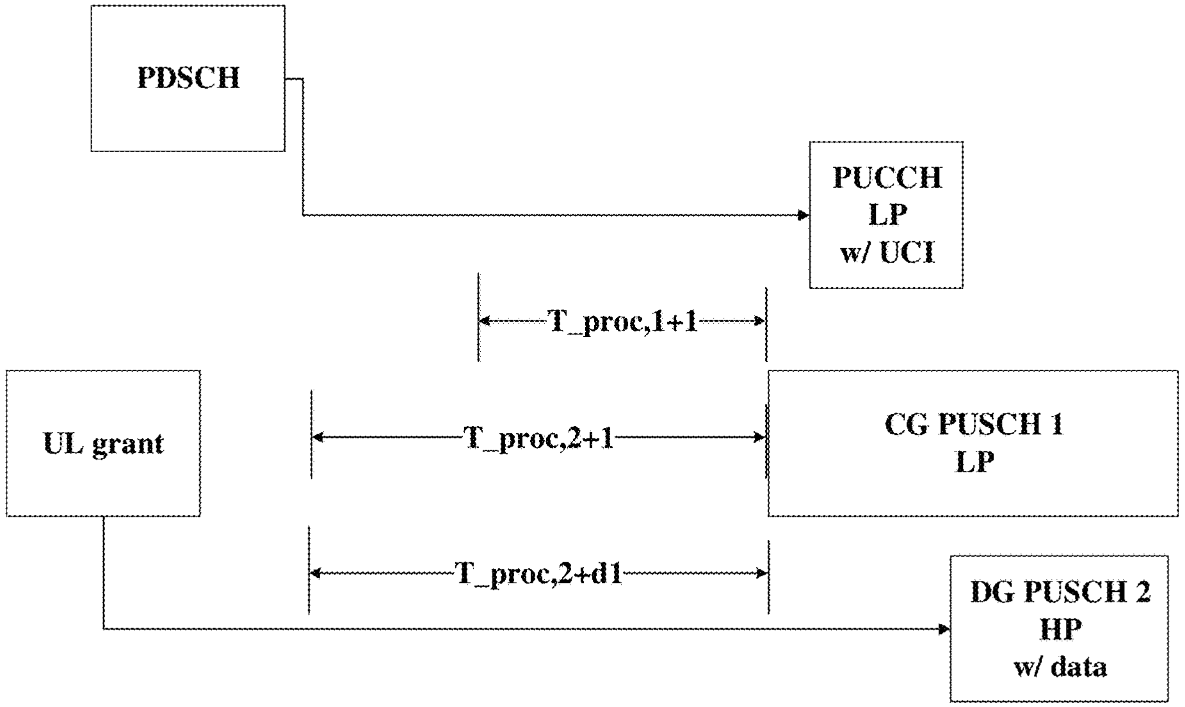

UE behavior: the UE transmits a LP PUCCH and a HP DG PUSCH 2 by time division multiplexing, and UCI is carried on a PUCCH (FIG. 10).

Optionally, the UE cancels the transmission of the LP CG PUSCH 1.

Implementation 1: The UE first determines that the UCI carried on the LP PUCCH is multiplexed on the LP CG PUSCH 1, and then the UE receives the UL grant of the scheduling HP DG PUSCH 2. In this case, the UE determines that the LP CG PUSCH 1 overlaps the HP DG PUSCH in time. Because the interval between the receiving moment of UL grant and the starting of the CG PUSCH 1 is greater than or equal to $T_{proc,2}+1$ and $T_{proc,1}+1$, and greater than or equal to $T_{proc,2}+d1$, the CG PUSCH 1 has not yet started to prepare and can be canceled by the UE. The UCI has not been multiplexed to the CG PUSCH 1. Therefore, the UE can carry the UCI on the PUCCH that is supposed to be multiplexed on the CG PUSCH 1 on the PUCCH for transmission.

Figure 11:
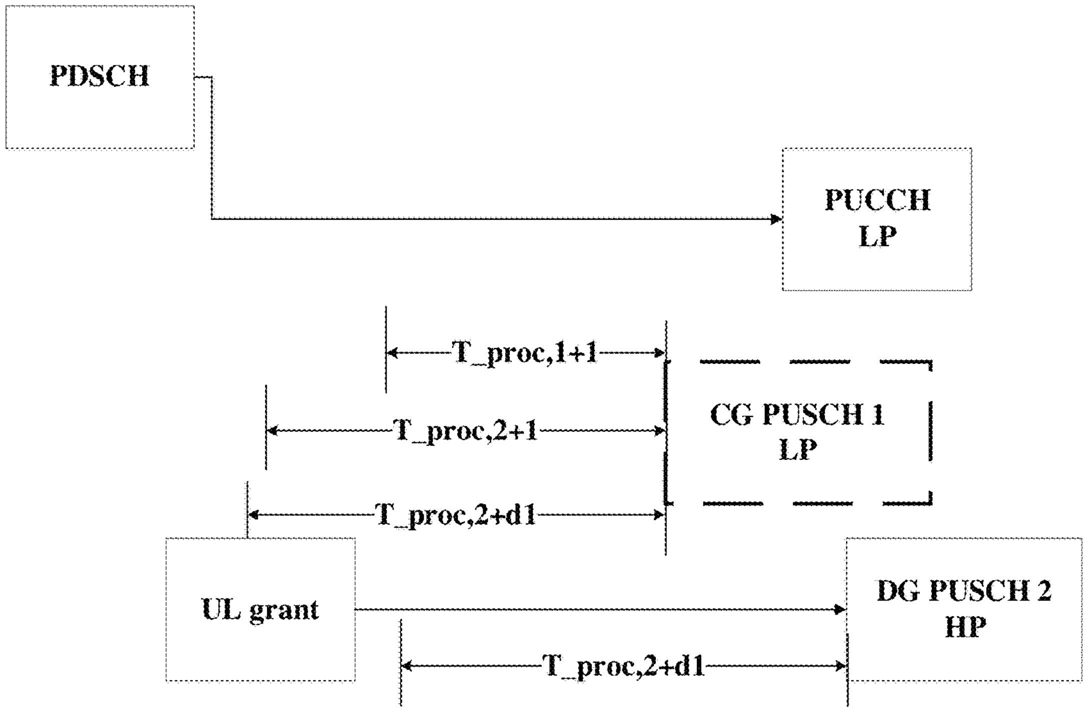
FIG. 11 to FIG. 13 are schematic diagrams of example 1b according to an embodiment of this application.

Example 1b: The LP PUCCH overlaps the LP CG PUSCH 1 in time, the CG PUSCH 1 overlaps the HP DG PUSCH 2 in time, and the LP PUCCH overlaps or does not overlap the HP DG PUSCH 2 in time. The time interval between the receiving moment of the UL grant of the scheduling DG PUSCH 2 and the start moment of the CG PUSCH 1 is smaller than $T_{proc,1}$+1 or smaller than $T_{proc,2}$+1. The time interval between the receiving moment of the UL grant of the DG PUSCH 2 and the start moment of the CG PUSCH 1 is smaller than $T_{proc,2}$+d1, and the time interval between the receiving moment of the UL grant of the DG PUSCH 2 and the start moment of the DG PUSCH 1 is greater than or equal to $T_{proc,2}$+d1 (FIG. 11).

Figure 12:
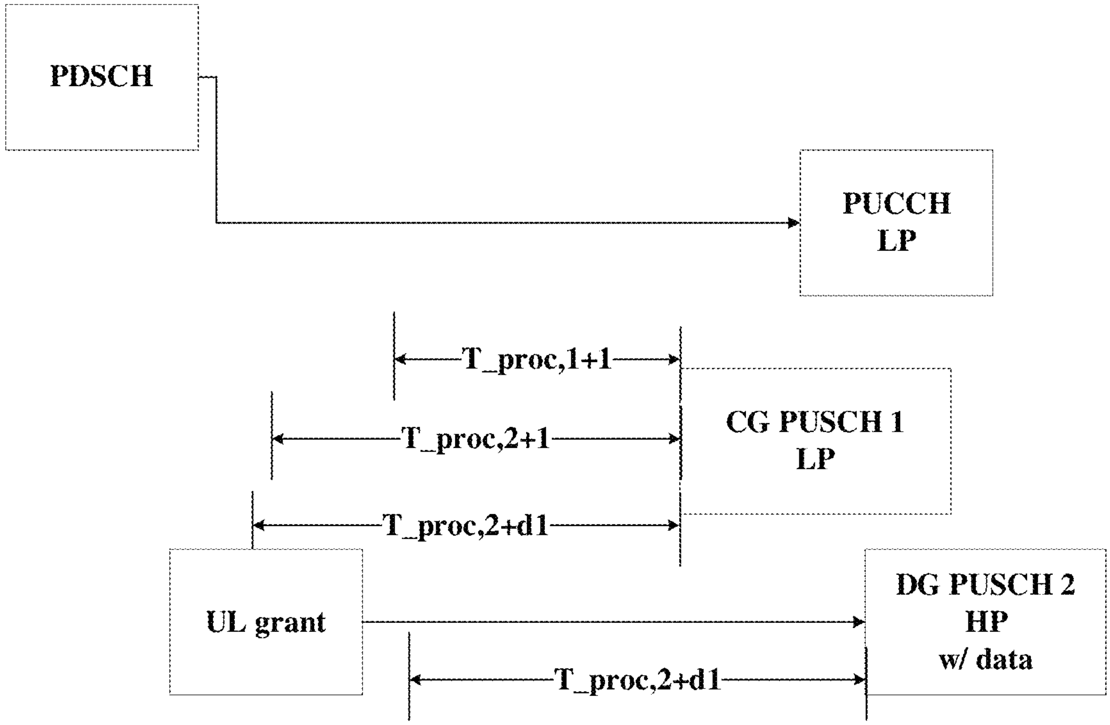

UE behavior 1: UCI carried on the LP PUCCH cannot be multiplexed on the HP DG PUSCH 2 for transmission, that is, the UE only transmits data on the DG PUSCH 2 (FIG. 12).

Optionally, the UE cancels the (part of) transmission of the CG PUSCH 1 in a case that the CG PUSCH 1 overlaps the DG PUSCH 2.

Implementation 1: the UE first determines that the UCI carried on the LP PUCCH is multiplexed on the LP CG PUSCH 1, and then the UE receives the UL grant of the scheduling HP DG PUSCH 2. In this case, the UE determines that the LP CG PUSCH 1 overlaps the HP DG PUSCH in time. Because an interval between the UL grant and the CG PUSCH 1 is smaller than $T_{proc,2}$+1 or $T_{proc,1}$+1, the UCI has begun to be multiplexed to the CG PUSCH 1.

Because the interval between the receiving moment of the UL grant and the start moment of the CG PUSCH 1 is smaller than $T_{proc,2}$+d1, the CG PUSCH 1 has started to prepare and can only be partially transmitted by the UE. That is, the UE cancels the (part of) transmission of the CG PUSCH 1 in a case that the CG PUSCH 1 overlaps the DG PUSCH 2. After the UE cancels the transmission of the CG PUSCH 1, the UCI that has started to be multiplexed on the PUCCH of the CG PUSCH 1 cannot be multiplexed on the HP DG PUSCH 2 for transmission.

UE behavior 2: the UE does not expect that the time interval between the receiving moment of the UL grant of the DG PUSCH 2 and the start moment of the CG PUSCH 1 is smaller than $T_{proc,1}$+1 or smaller than $T_{proc,2}$+1, and the time interval between the receiving moment of the UL grant of the DG PUSCH 2 and the start moment of the CG PUSCH 1 is smaller than $T_{proc,2}$+dL.

Figure 13:
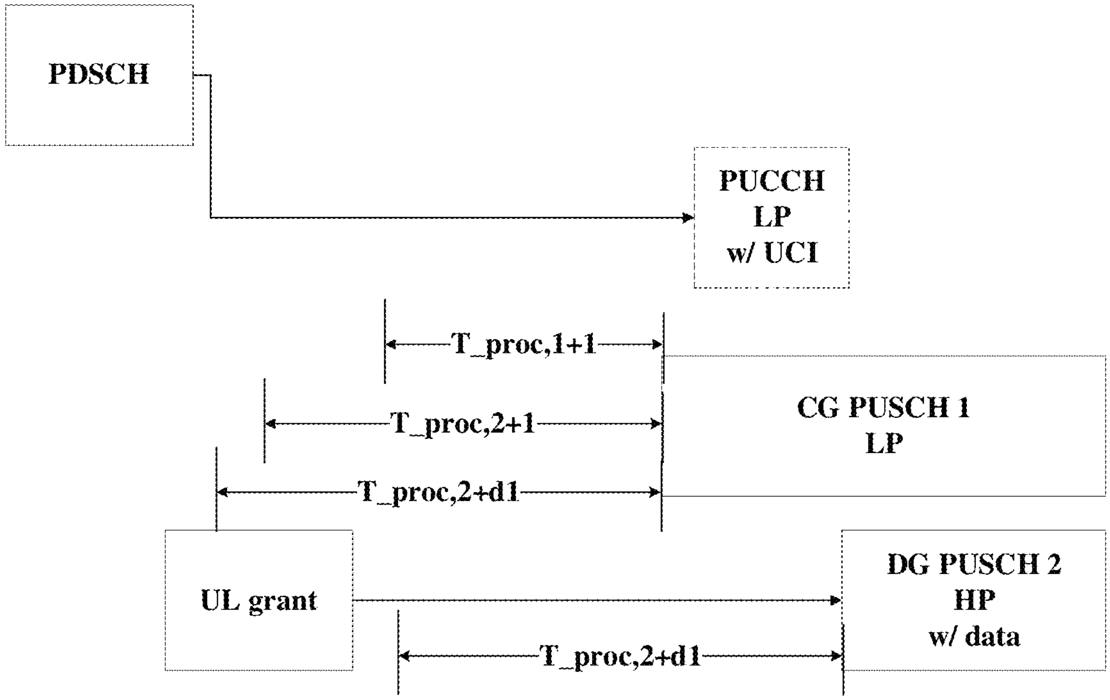

UE behavior 3: if the LP PUCCH does not overlap the HP DG PUSCH 2 in time, the UE transmits the LP PUCCH and the HP DG PUSCH 2 by time division multiplexing, that is, UCI is carried on the PUCCH, and data is transmitted on the DG PUSCH 2 (FIG. 13).

Optionally, the UE cancels the (part of) transmission of the CG PUSCH 1 in a case that the CG PUSCH 1 overlaps the DG PUSCH 2.

Figure 14:
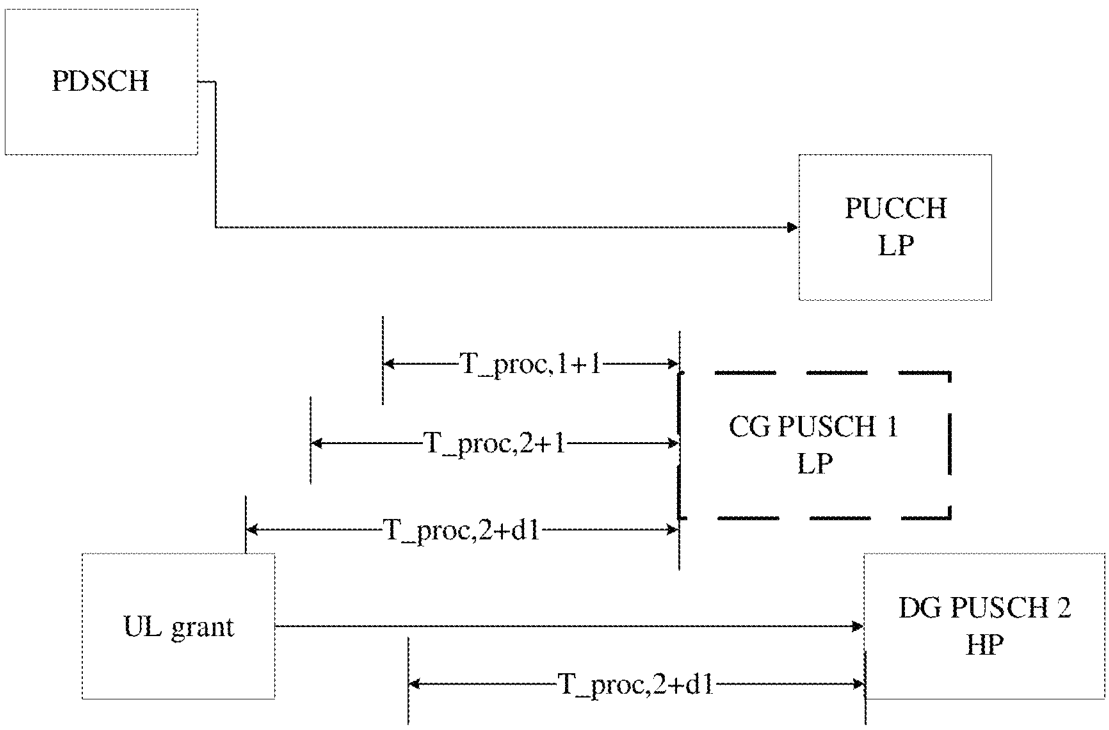
FIG. 14 to FIG. 17 are schematic diagrams of example 1c according to an embodiment of this application.

Example 1c: the LP PUCCH overlaps the LP CG PUSCH 1 in time, the CG PUSCH 1 overlaps the HP DG PUSCH 2 in time, and the LP PUCCH overlaps or does not overlap the HP DG PUSCH 2 in time. The time interval between the receiving moment of the UL grant of the scheduling DG PUSCH 2 and the start moment of the CG PUSCH 1 is greater than or equal to $T_{proc,1}$+1 and greater than or equal to $T_{proc,2}$+1, and the time interval between the receiving moment of the UL grant of the scheduling DG PUSCH 2 and the start moment of the CG PUSCH 1 is smaller than $T_{proc,2}$+d1. The time interval between the receiving moment of the UL grant of the scheduling DG PUSCH 2 and the start moment of the DG PUSCH 1 is greater than or equal to $T_{proc,2}$+d1 (FIG. 14).

Figure 15:
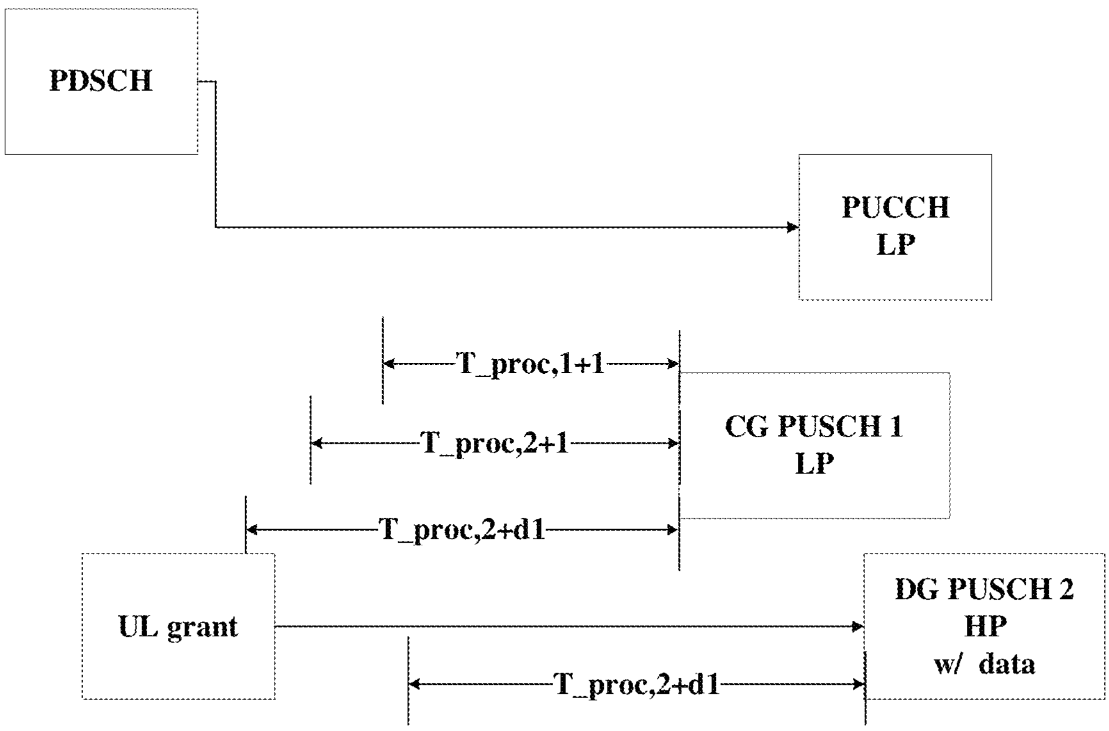

UE behavior 1: UCI carried on the LP PUCCH cannot be multiplexed on the HP DG PUSCH 2 for transmission, that is, the UE only transmits data on the DG PUSCH 2 (FIG. 15).

Optionally, the UE cancels the (part of) transmission of the LP CG PUSCH 1 in a case that the CG PUSCH 1 overlaps the DG PUSCH 2.

Figure 16:
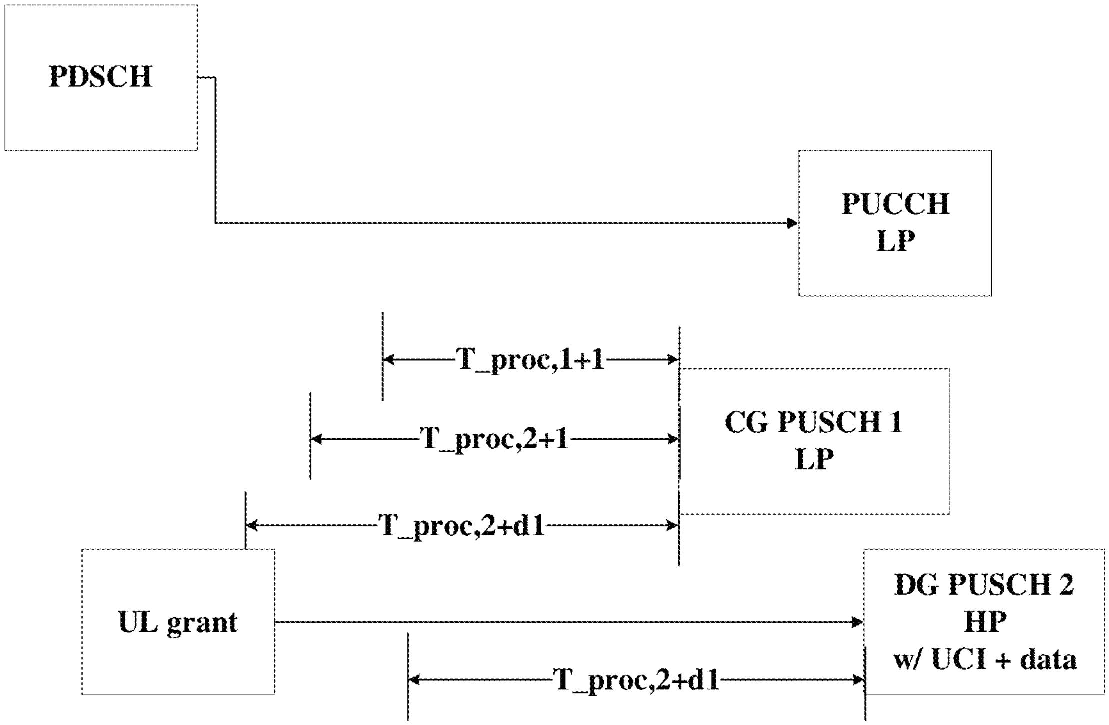

UE behavior 2: if the LP PUCCH overlaps the HP DG PUSCH 2 in time, UCI carried on the LP PUCCH can be multiplexed on the HP DG PUSCH 2 for transmission (FIG. 16).

Optionally, the UE cancels the (part of) transmission of the LP CG PUSCH 1 in a case that the CG PUSCH 1 overlaps the DG PUSCH 2.

UE behavior 3: the UE does not expect that the time interval between the receiving moment of the UL grant of the DG PUSCH 2 and the start moment of the CG PUSCH 1 is greater than or equal to $T_{proc,1}$+1 and greater than or equal to $T_{pro,2}$+1, and the time interval between the receiving moment of the UL grant of the DG PUSCH 2 and the start moment of the CG PUSCH 1 is smaller than $T_{prox,2}$+d1.

Figure 17:
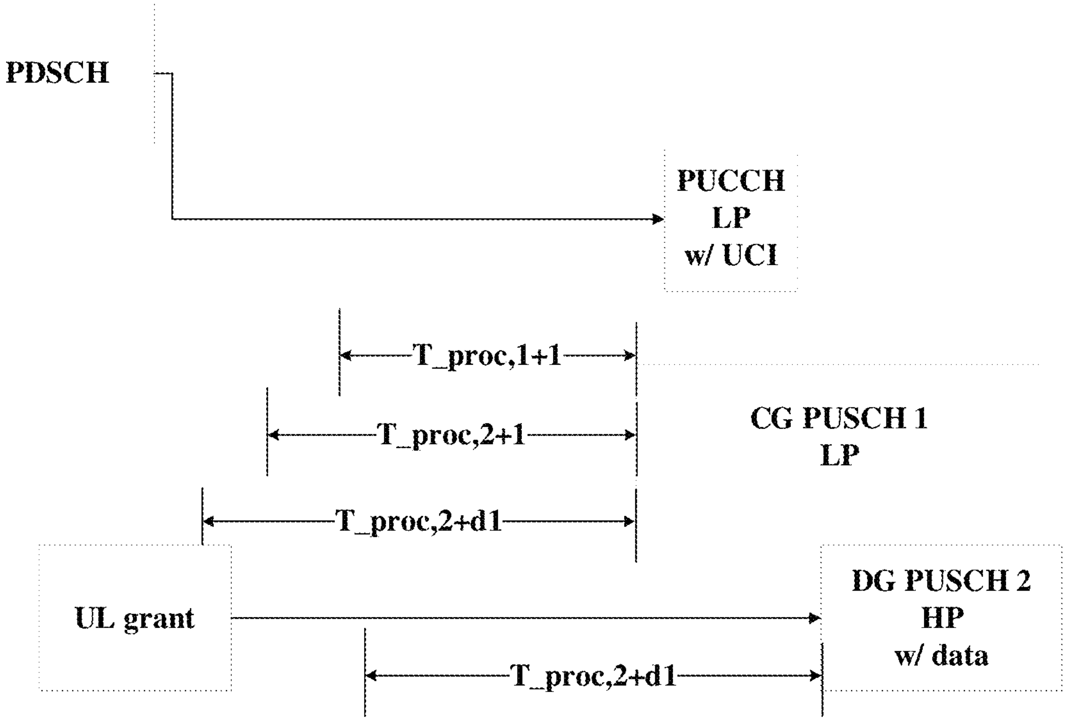

UE behavior 4: if the LP PUCCH does not overlaps the HP DG PUSCH 2 in time, the UE transmits the LP PUCCH and the HP DG PUSCH 2 by time division multiplexing, that is, the UCI is carried on the PUCCH, and the data is transmitted on the DG PUSCH 2 (FIG. 17).

Optionally, the UE cancels the (part of) transmission of the CG PUSCH 1 in a case that the CG PUSCH 1 overlaps the DG PUSCH 2.

Figure 18:
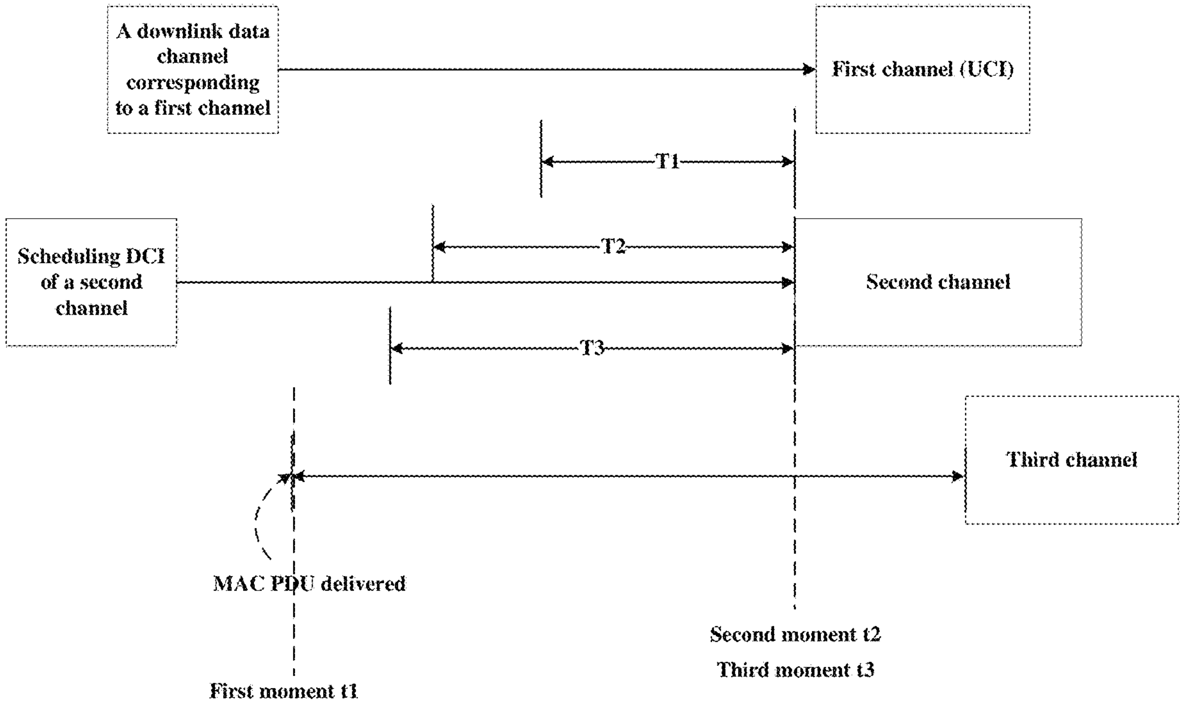
FIG. 18 is a schematic diagram of example 2 according to an embodiment of this application.

Example 2: referring to FIG. 18, the first channel is the LP PUCCH, the second channel is the LP DG PUSCH, and the third channel is the HP CG PUSCH.

Figure 19:
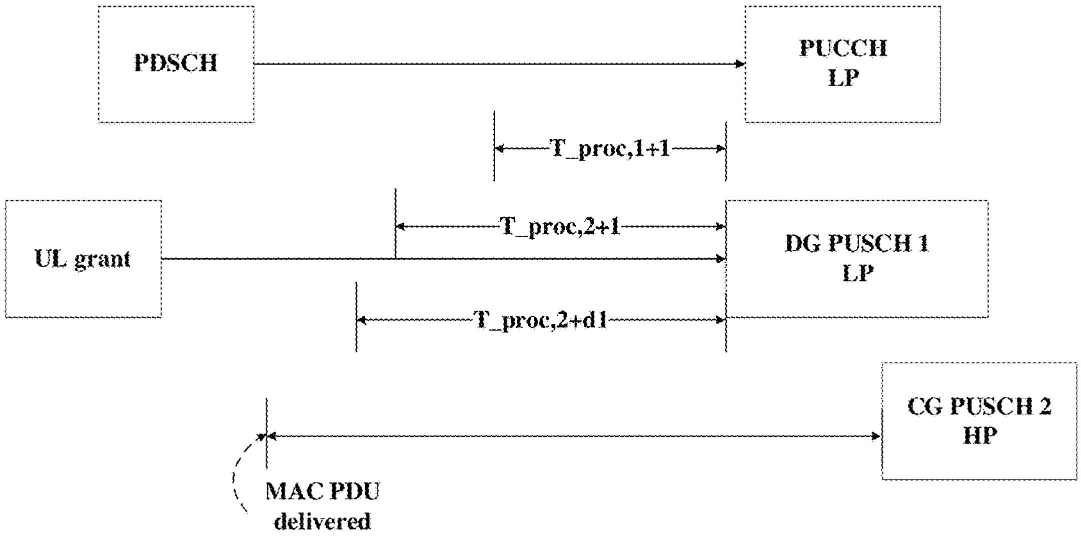
FIG. 19 to FIG. 20 are schematic diagrams of example 2a according to an embodiment of this application.

Example 2a: the LP PUCCH overlaps the LP DG PUSCH 1 in time, the DG PUSCH 1 overlaps the HP CG PUSCH 2 in time, and the LP PUCCH overlaps the HP CG PUSCH 2 in time. A time interval between a moment generated by a MAC PDU corresponding to the CG PUSCH 2 and the start moment of the DG PUSCH 1 is greater than or equal to $T_{proc,1}$+1 and greater than or equal to $T_{proc,2}$+1. The time interval between the moment generated by the MAC PDU corresponding to CG PUSCH 2 and the start moment of the DG PUSCH 1 is greater than or equal to $T_{proc,2}$+d1 (FIG. 19).

Figure 20:
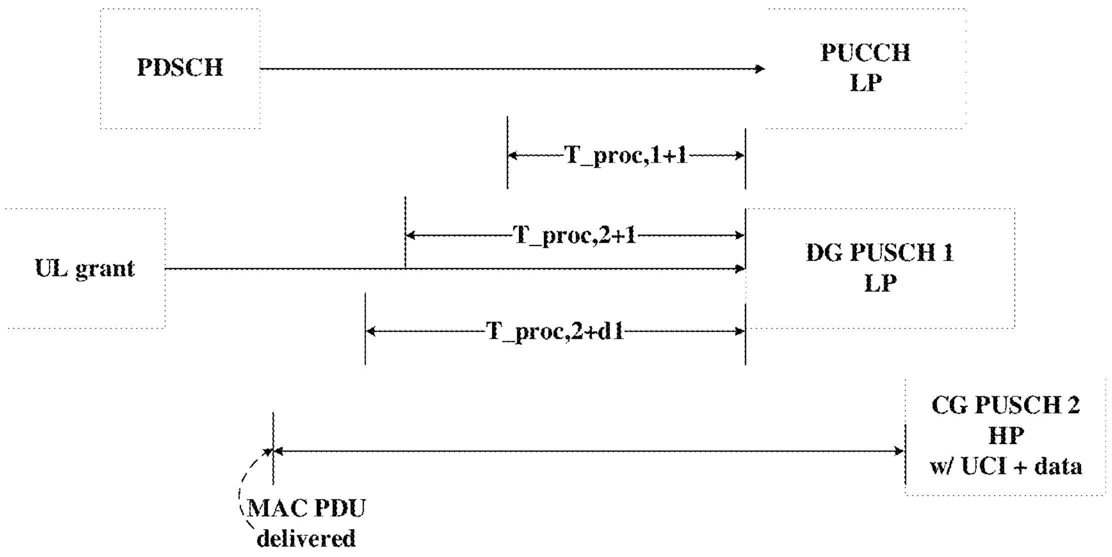

UE behavior: UCI carried on the LP PUCCH can be multiplexed to the HP CG PUSCH 2 for transmission (FIG. 20).

Optionally, the UE cancels the transmission of the LP DG PUSCH 1.

Implementation 1: the UE first determines that the UCI carried on the LP PUCCH is multiplexed on the LP DG PUSCH 1, and then the UE receives the PDU corresponding to the HP CG PUSCH generated by the MAC. In this case, the UE determines that the LP DG PUSCH 1 overlaps the HP CG PUSCH 2 in time. Because the time interval between a moment when the UE receives a PDU corresponding to the HP CG PUSCH generated by the MAC and the start moment of the DG PUSCH 1 is greater than or equal to $T_{proc,2}$+1 and $T_{proc,1}$+1, and greater than or equal to $T_{proc,2}$+d1. The DG PUSCH 1 has not yet started to prepare and can be canceled by the UE, and the UCI has not been multiplexed to the DG PUSCH 1. Therefore, the UE can multiplex the UCI on the PUCCH that was supposed to be multiplexed on the DG PUSCH 1 on the HP CG PUSCH 2 for transmission.

Figure 21:
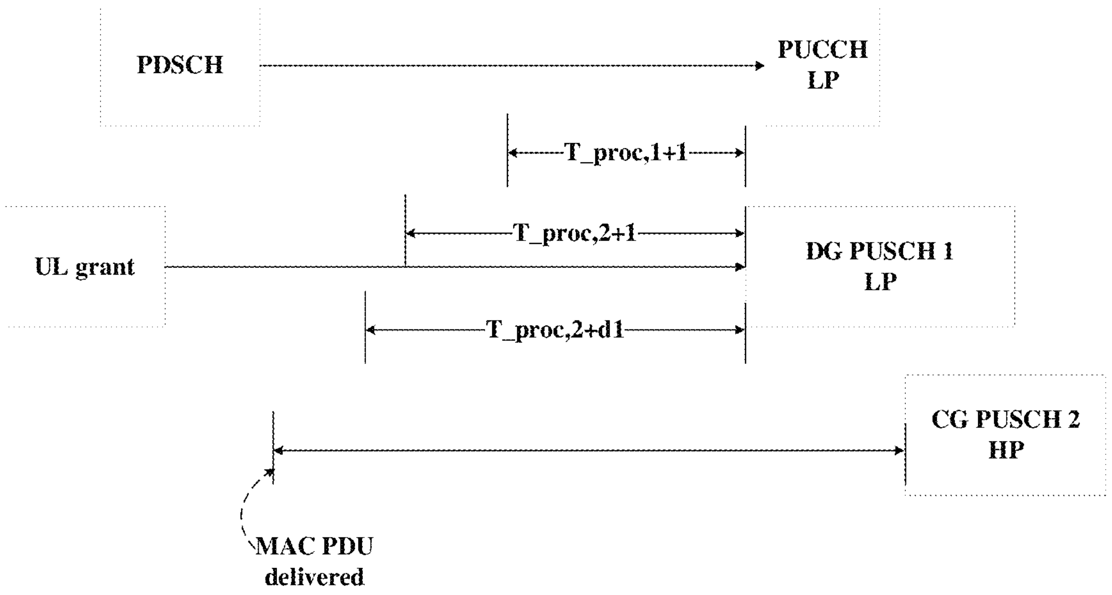
FIG. 21 to FIG. 22 are schematic diagrams of example 2a' according to an embodiment of this application.

Example 2a': the LP PUCCH overlaps the LP DG PUSCH 1 in time, the DG PUSCH 1 overlaps the HP CG PUSCH 2 in time, and the LP PUCCH does not overlap the HP CG PUSCH 2 in time. The time interval between the moment generated by the MAC PDU corresponding to the CG PUSCH 2 and the start moment of the DG PUSCH 1 is greater than or equal to $T_{proc,1}$+1 and greater than or equal to $T_{proc,2}$+1. The time interval between the moment generated by the MAC PDU corresponding to the CG PUSCH 2 and the start moment of the DG PUSCH 1 is greater than or equal to $T_{proc,2}$+d1 (FIG. 21).

Figure 22:
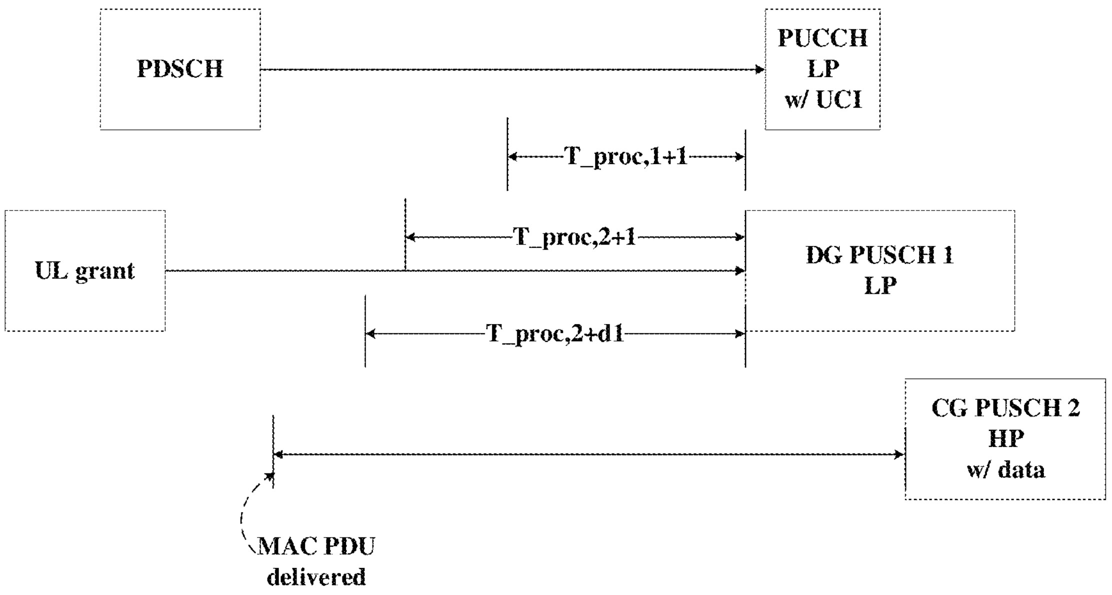

UE behavior: the UE transmits the LP PUCCH and the HP CG PUSCH 2 by time division multiplexing, and the UCI is carried on the PUCCH (FIG. 22).

The UE cancels the transmission of the LP DG PUSCH 1.

Implementation 1: the UE first determines that the UCI carried on the LP PUCCH is multiplexed on the LP DG PUSCH 1, and then the UE receives the PDU corresponding to the HP CG PUSCH generated by the MAC. In this case, the UE determines that the LP DG PUSCH 1 overlaps the HP CG PUSCH 2 in time. Because the moment when the UE receives the PDU corresponding to the HP CG PUSCH generated by the MAC is greater than or equal to $T_{proc,2}$+1 and $T_{proc,1}$+1, and greater than or equal to $T_{proc,2}$+d1, the DG PUSCH 1 has not started to prepare and can be canceled by the UE, and the UCI has not been multiplexed to the DG PUSCH 1. Therefore, the UE can carry the UCI that was supposed to be multiplexed on the PUCCH on the DG PUSCH 1 for transmission.

Figure 23:
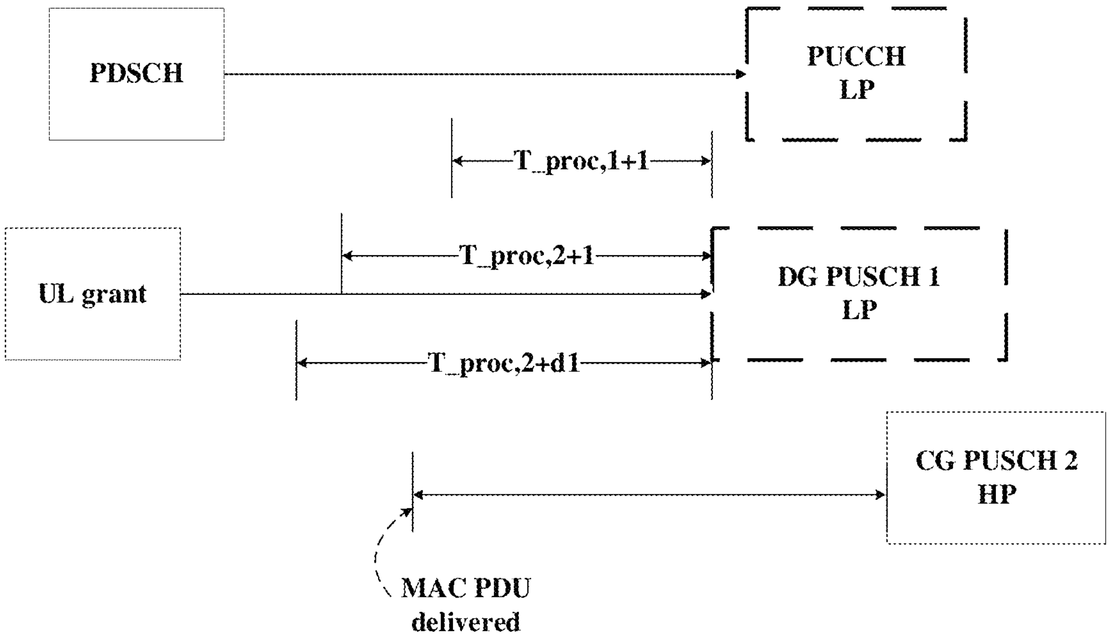
FIG. 23 to FIG. 25 are schematic diagrams of example 2b according to an embodiment of this application.

Example 2b: the LP PUCCH overlaps the LP DG PUSCH 1 in time, the DG PUSCH 1 overlaps the HP CG PUSCH 2 in time, and the LP PUCCH overlaps or does not overlap the HP CG PUSCH 2 in time. The time interval between the moment generated by the MAC PDU corresponding to the CG PUSCH 2 and the start moment of the DG PUSCH 1 is smaller than $T_{proc,1}$+1 or smaller than $T_{proc,2}$+1, and the time interval between the moment generated by the MAC PDU corresponding to the CG PUSCH 2 and the start moment of the DG PUSCH 1 is smaller than $T_{proc,2}$+d1 (FIG. 23).

Figure 24:
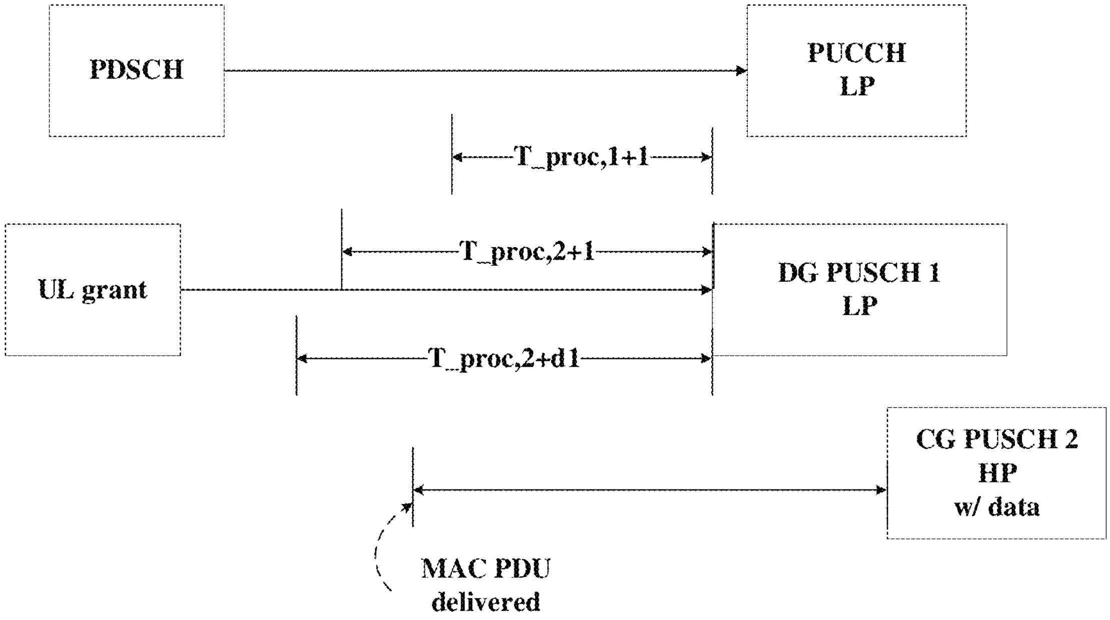

UE behavior 1: the UCI carried on the LP PUCCH cannot be multiplexed on the HP CG PUSCH 2 for transmission, that is, the UE only transmits data on the CG PUSCH 2 (FIG. 24).

Optionally, the UE cancels the (part of) transmission of the LP DG PUSCH 1 in a case that the DG PUSCH 1 overlaps the CG PUSCH 2.

Implementation 1: the UE first determines that the UCI carried on the LP PUCCH is multiplexed on the LP DG PUSCH 1, and then the UE receives the PDU corresponding to the HP CG PUSCH generated by the MAC. In this case, the UE determines that the LP DG PUSCH 1 overlaps the HP CG PUSCH 2 in time. Because the time interval between the moment when the UE receives the PDU corresponding to the HP CG PUSCH generated by the MAC and the start moment of the DG PUSCH 1 is smaller than $T_{proc,2}$+1 or $T_{proc,1}$+1, the UCI has started to be multiplexed to the DG PUSCH 1.

The time interval between the moment when the UE receives the PDU corresponding to the HP CG PUSCH generated by the MAC and the start moment of the CG PUSCH 1 is smaller than $T_{proc,2}$+d1. Therefore, the DG PUSCH 1 has started to prepare and only part of the transmission can be canceled by the UE. That is, in a case that the DG PUSCH 1 overlaps the CG PUSCH 2, the UE cancels the (part of) transmission of the DG PUSCH 1.

Optionally, after the UE cancels the transmission of the DG PUSCH 1, the UCI that was supposed to be multiplexed on the PUCCH of the DG PUSCH 1 cannot be multiplexed on the HP CG PUSCH 2 for transmission.

Figure 25:
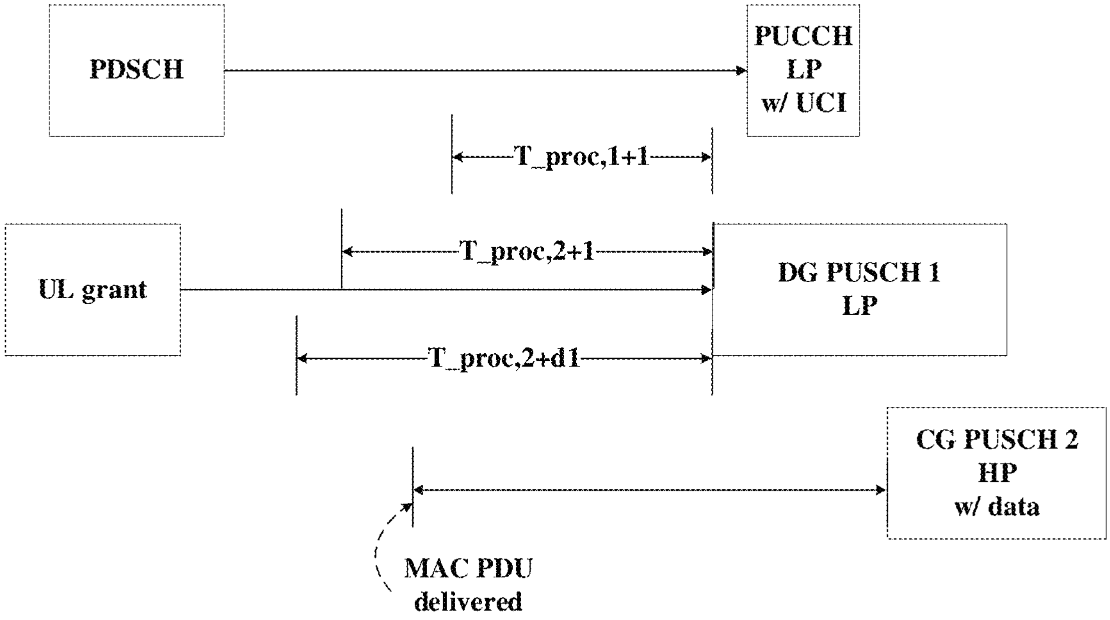

UE behavior 2: if the LP PUCCH does no overlap the HP CG PUSCH 2 in time, the UE transmits the LP PUCCH and HP CG PUSCH 2 by time division multiplexing, and the UCI is carried on the PUCCH (FIG. 25).

Optionally, the UE cancels (part of) transmission of the LP DG PUSCH 1 in a case that the DG PUSCH 1 overlaps the CG PUSCH 2.

Figure 26:
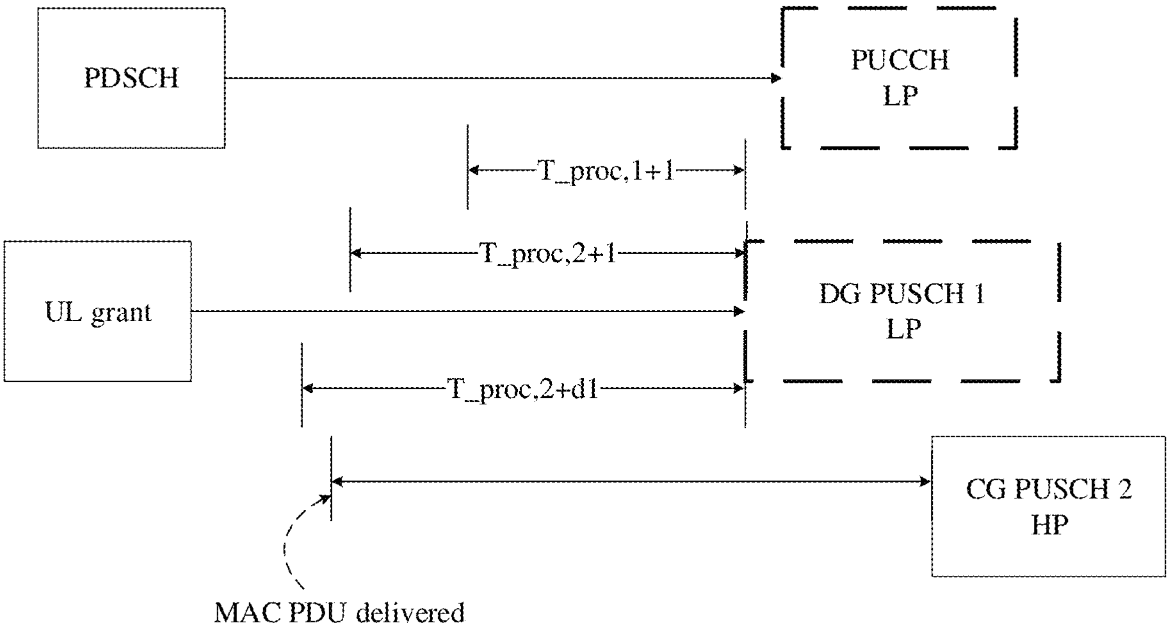
FIG. 26 to FIG. 29 are schematic diagrams of example 2c according to an embodiment of this application.

Example 2c: the LP PUCCH overlaps the LP DG PUSCH 1 in time, the DG PUSCH 1 overlaps the HP CG PUSCH 2 in time, and the LP PUCCH overlaps or does not overlap the HP CG PUSCH 2 in time. The time interval between the moment generated by the MAC PDU corresponding to the CG PUSCH 2 and the start moment of the DG PUSCH 1 is greater than or equal to $T_{proc,1}$+1 and greater than or equal to $T_{proc,2}$+1, and the time interval between the moment generated by the MAC PDU corresponding to the CG PUSCH 2 and the start moment of the DG PUSCH 1 is smaller than $T_{proc,2}$+d1 (FIG. 26).

Figure 27:
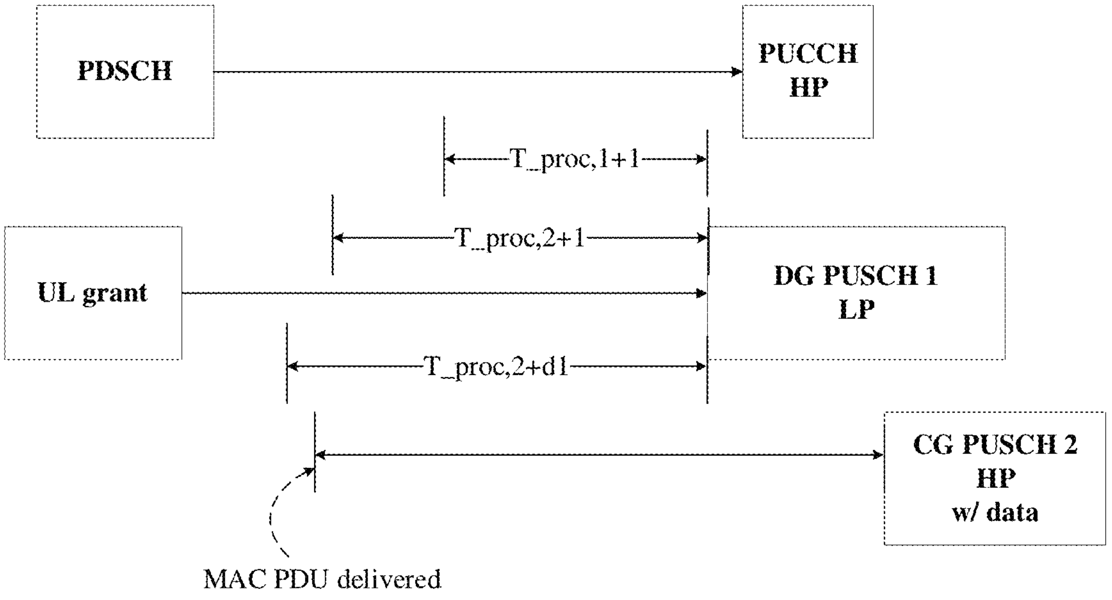

UE behavior 1: The UCI carried on the LP PUCCH cannot be multiplexed on the HP CG PUSCH 2 for transmission, that is, the UE only transmits data on the CG PUSCH 2 (FIG. 27).

Optionally, the UE cancels the (part of) transmission of the LP DG PUSCH 1 in a case that the DG PUSCH 1 overlaps the CG PUSCH 2.

Figure 28:
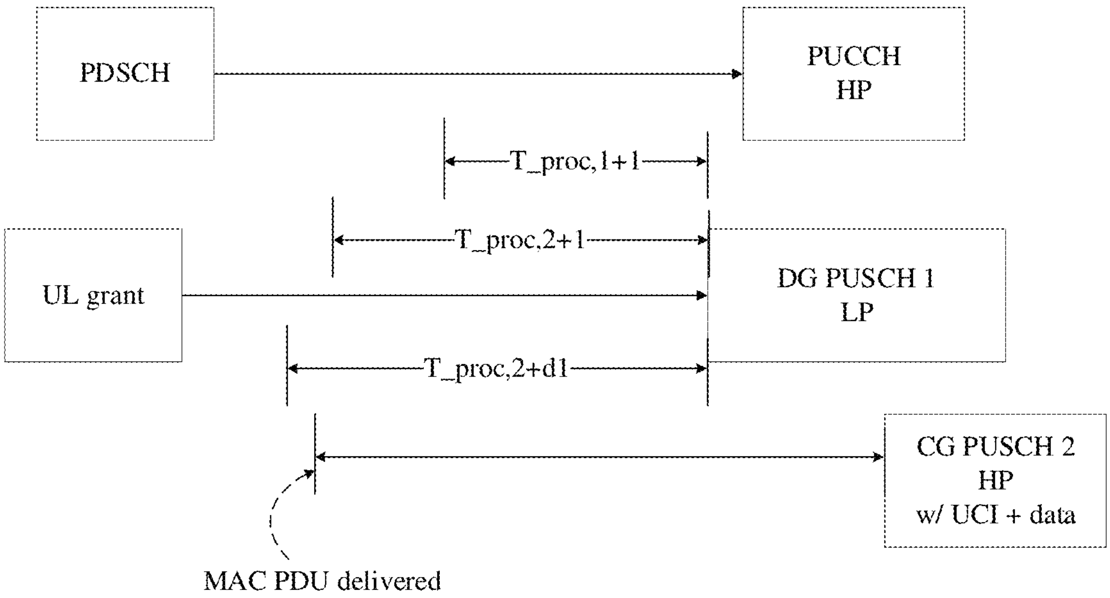

UE behavior 2: if the LP PUCCH overlaps the HP CG PUSCH 2 in time, the UCI carried on the LP PUCCH can be multiplexed on the HP CG PUSCH 2 for transmission (FIG. 28).

Optionally, the UE cancels (part of) transmission of the LP DG PUSCH 1 in a case that the DG PUSCH 1 overlaps the CG PUSCH 2.

Figure 29:
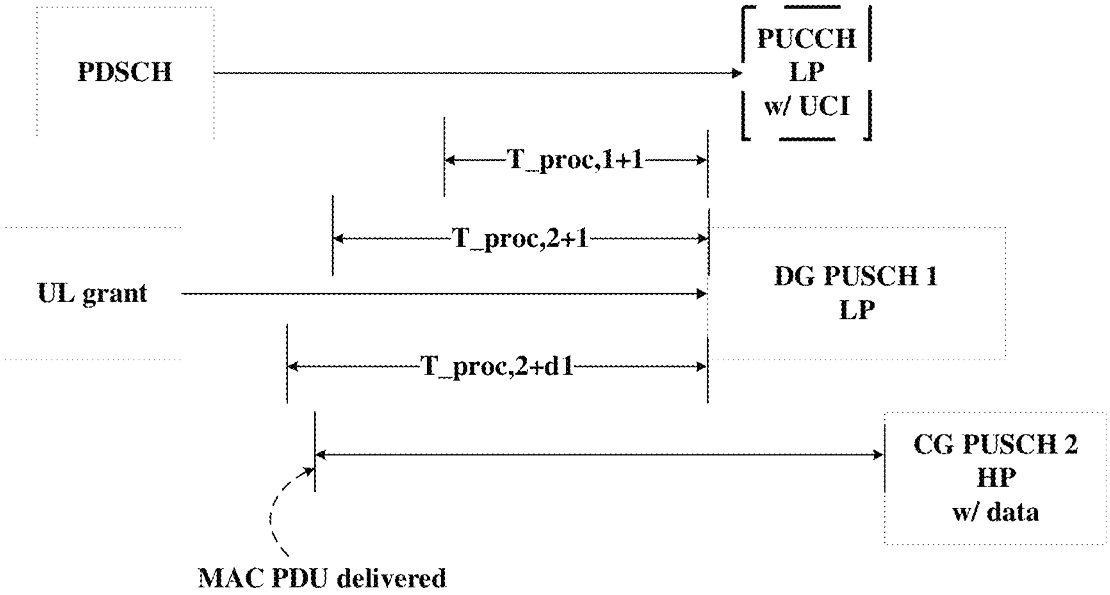

UE behavior 3: if the LP PUCCH does not overlap the HP CG PUSCH 2 in time, the UE transmits the LP PUCCH and the HP CG PUSCH 2 by time division multiplexing, and the UCI is carried on the PUCCH (FIG. 29).

Optionally, the UE cancels the (part of) transmission of the LP DG PUSCH 1 in a case that the DG PUSCH 1 overlaps the CG PUSCH 2.

Figure 30:
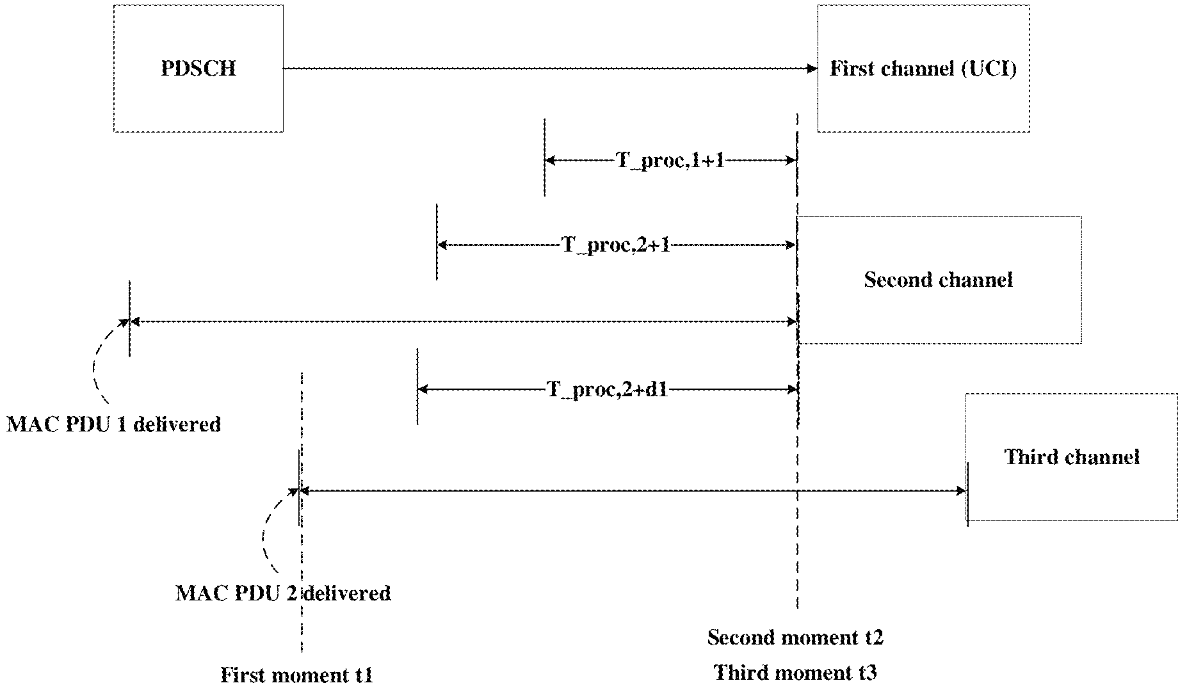
FIG. 30 is a schematic diagram of example 3 according to an embodiment of this application.

Example 3: referring to FIG. 30, the first channel is the LP PUCCH, the second channel is the LP CG PUSCH, and the third channel is the HP CG PUSCH.

Figure 31:
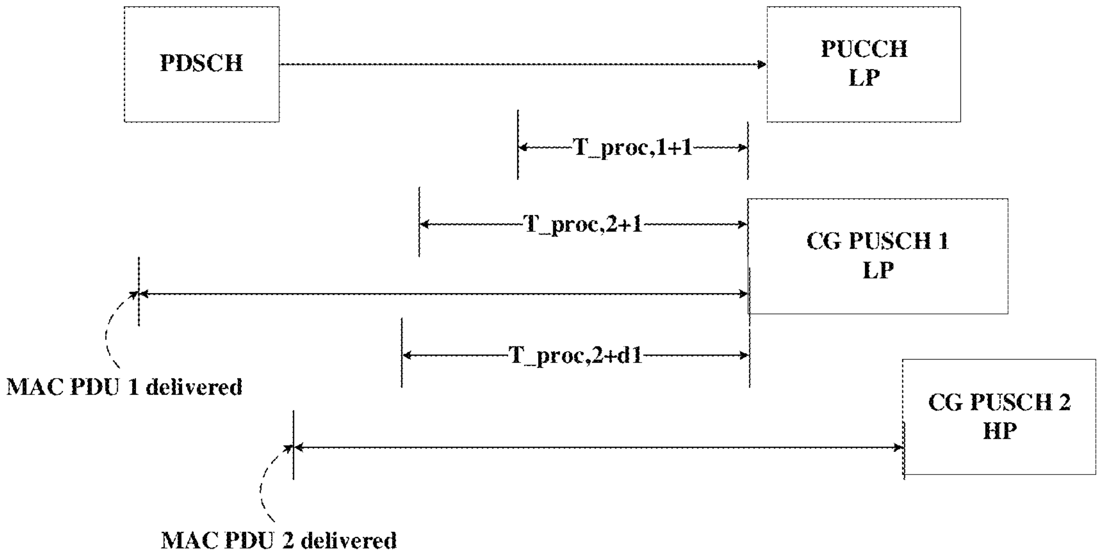
FIG. 31 to FIG. 34 are schematic diagrams of example 3a according to an embodiment of this application.

Example 3a: the LP PUCCH overlaps the LP CG PUSCH 1 in time, the CG PUSCH 1 overlaps the HP CG PUSCH 2 in time, and the LP PUCCH overlaps the HP CG PUSCH 2 in time. The time interval between the moment generated by the MAC PDU corresponding to the CG PUSCH 2 and the start moment of the CG PUSCH 1 is greater than or equal to $T_{proc,1}$+1 and greater than or equal to $T_{proc,2}$+1, and the time interval between the moment generated by the MAC PDU corresponding to the CG PUSCH 2 and the start moment of the CG PUSCH 1 is greater than or equal to $T_{proc,2}$+d1 (FIG. 31).

Figure 32:
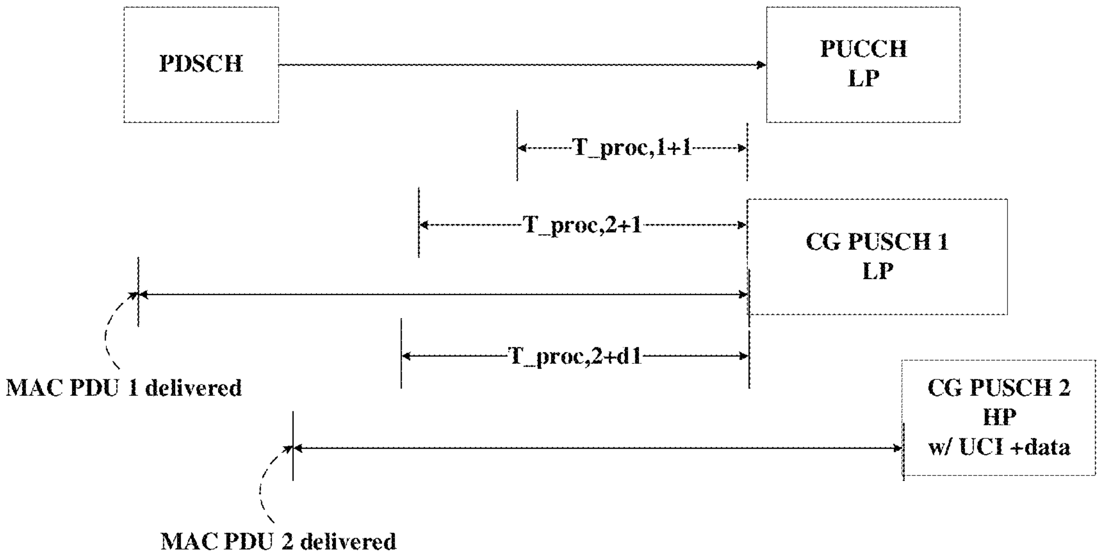

UE behavior: the UCI carried on the LP PUCCH can be multiplexed on the HP CG PUSCH 2 for transmission (FIG. 32).

Optionally, the UE cancels the transmission of the LP CG PUSCH 1.

Figure 33:
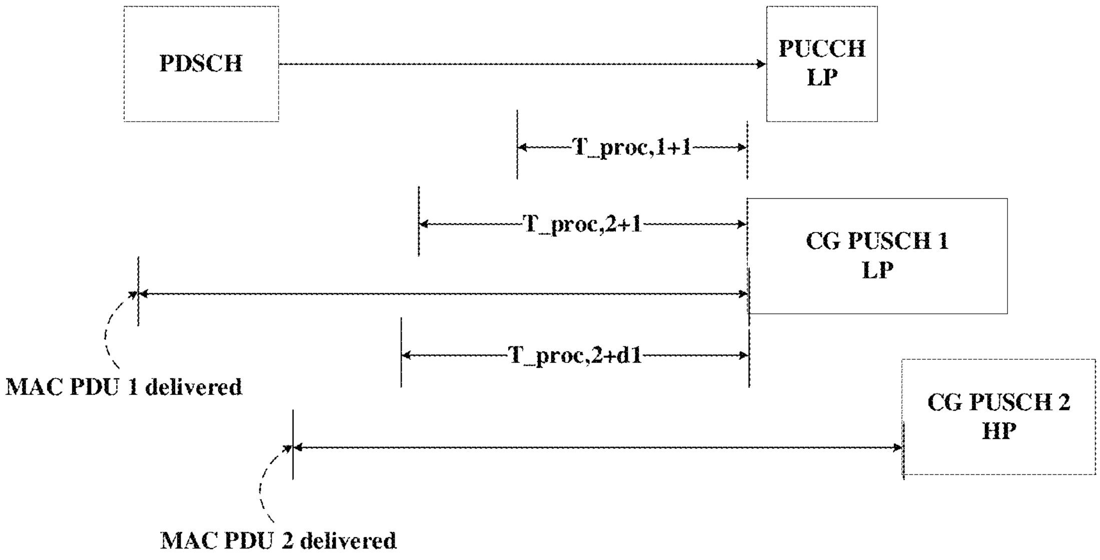

Example 3a': the LP PUCCH overlaps the LP CG PUSCH 1 in time, the CG PUSCH 1 overlaps the HP CG PUSCH 2 in time, and the LP PUCCH does not overlap the HP CG PUSCH 2 in time. The time interval between the moment generated by the MAC PDU corresponding to the CG PUSCH 2 and the start moment of the CG PUSCH 1 is greater than or equal to $T_{proc,1}$+1 and greater than or equal to $T_{proc,2}$+1, and the time interval between the moment generated by the MAC PDU corresponding to the CG PUSCH 2 and the start moment of the CG PUSCH 1 is greater than or equal to $T_{proc,2}$+d1 (FIG. 33).

Figure 34:
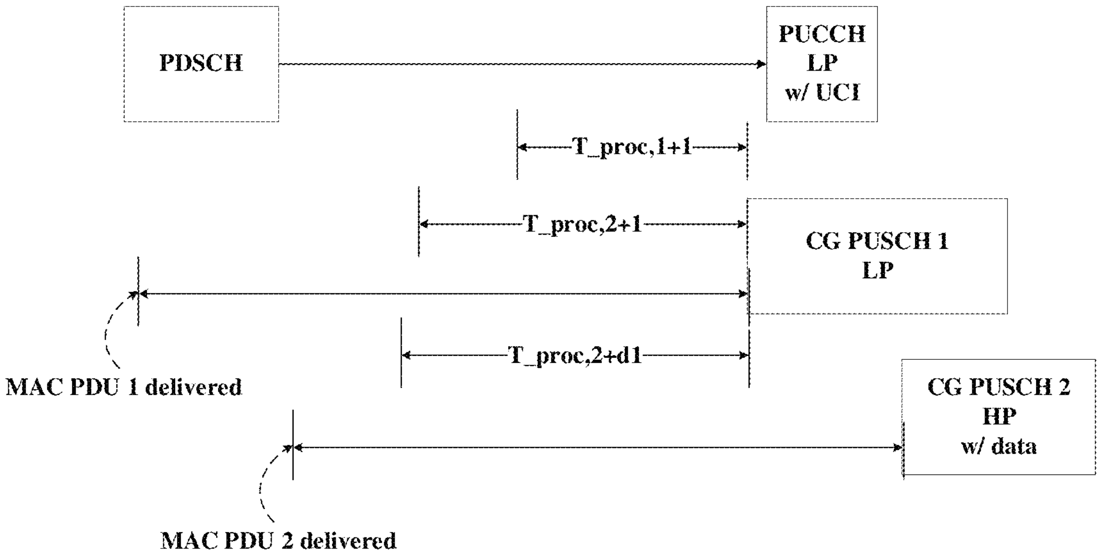

UE behavior: the UE transmits the LP PUCCH and the HP CG PUSCH 2 by time division multiplexing, and the UCI is carried on the PUCCH (FIG. 34).

Optionally, the UE cancels the transmission of the LP CG PUSCH 1.

Figure 35:
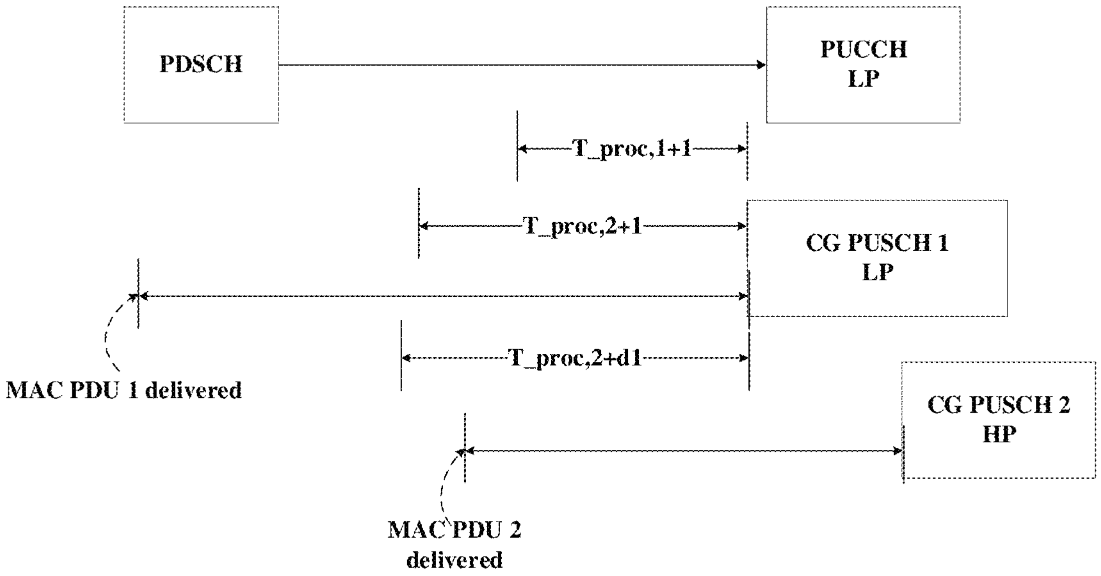
FIG. 35 to FIG. 37 are schematic diagrams of example 3b according to an embodiment of this application.

Example 3b: the LP PUCCH overlaps the LP CG PUSCH 1 in time, the CG PUSCH 1 overlaps the HP CG PUSCH 2 in time, and the LP PUCCH overlaps or does not overlap the HP CG PUSCH 2 in time. The time interval between the moment generated by the MAC PDU corresponding to the CG PUSCH 2 and the start moment of the CG PUSCH 1 is smaller than $T_{proc,1}$+1 or $T_{proc,2}$+1, and the time interval between the moment generated by the MAC PDU corresponding to the CG PUSCH 2 and the start moment of the CG PUSCH 1 is smaller than $T_{proc,2}$+d1 (FIG. 35).

Figure 36:
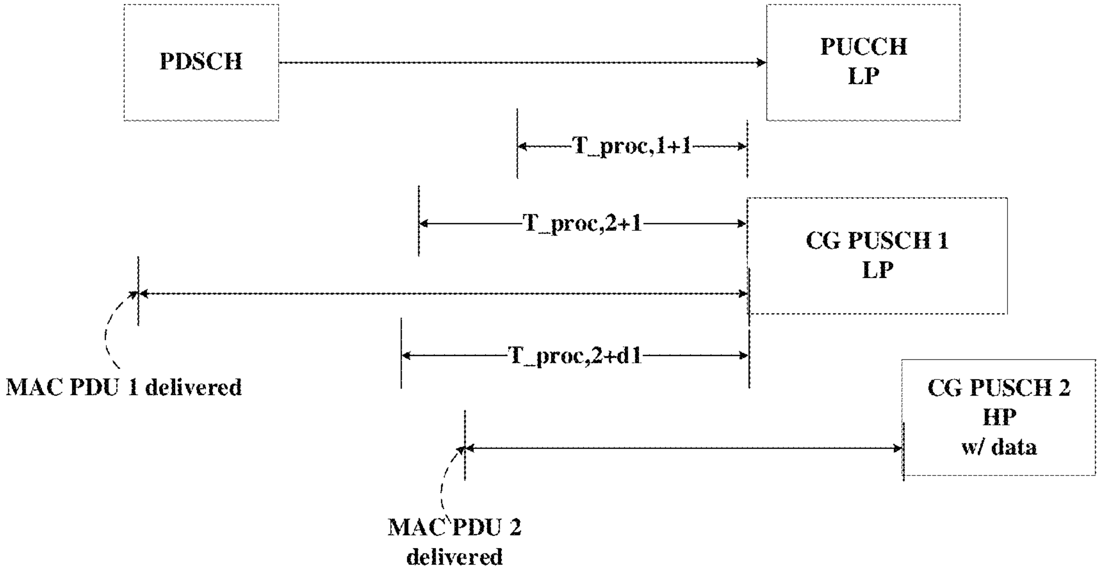

UE behavior 1: the UCI carried on the LP PUCCH cannot be multiplexed on the HP CG PUSCH 2 for transmission, that is, the UE only transmits data on the CG PUSCH 2 (FIG. 36).

Optionally, the UE cancels the (part of) transmission of the LP CG PUSCH 1 in a case that the CG PUSCH 1 overlaps the CG PUSCH 2.

Figure 37:
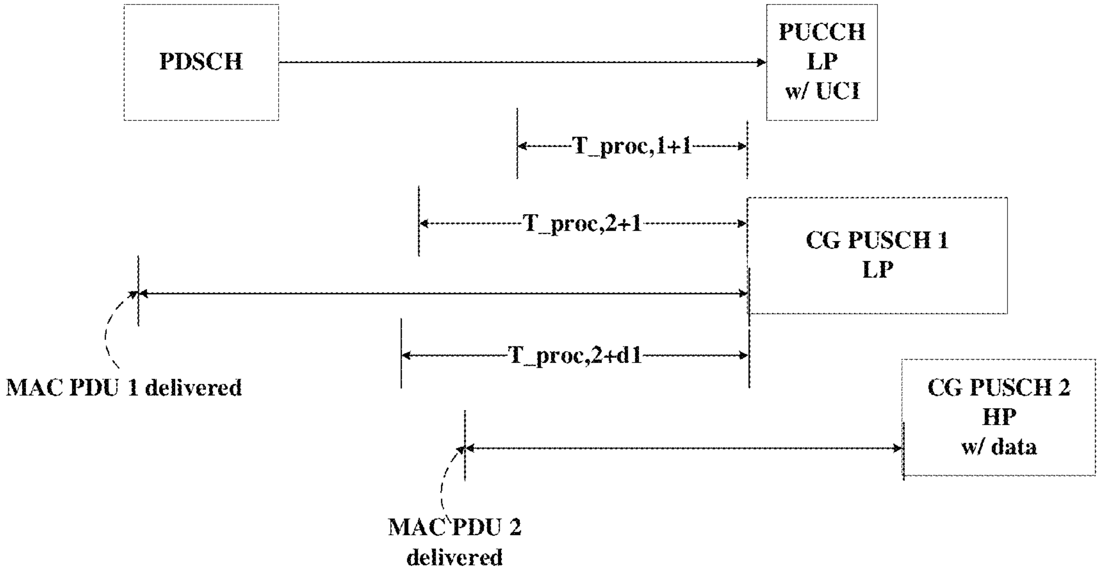

UE behavior 2: if the LP PUCCH does not overlap the HP CG PUSCH 2 in time, the UE time division multiplexed transmission LP PUCCH and HP CG PUSCH 2, and the UCI is carried on the PUCCH (FIG. 37).

Optionally, the UE cancels the (part of) transmission of the LP CG PUSCH 1 in a case that the CG PUSCH 1 overlaps the CG PUSCH 2.

Figure 38:
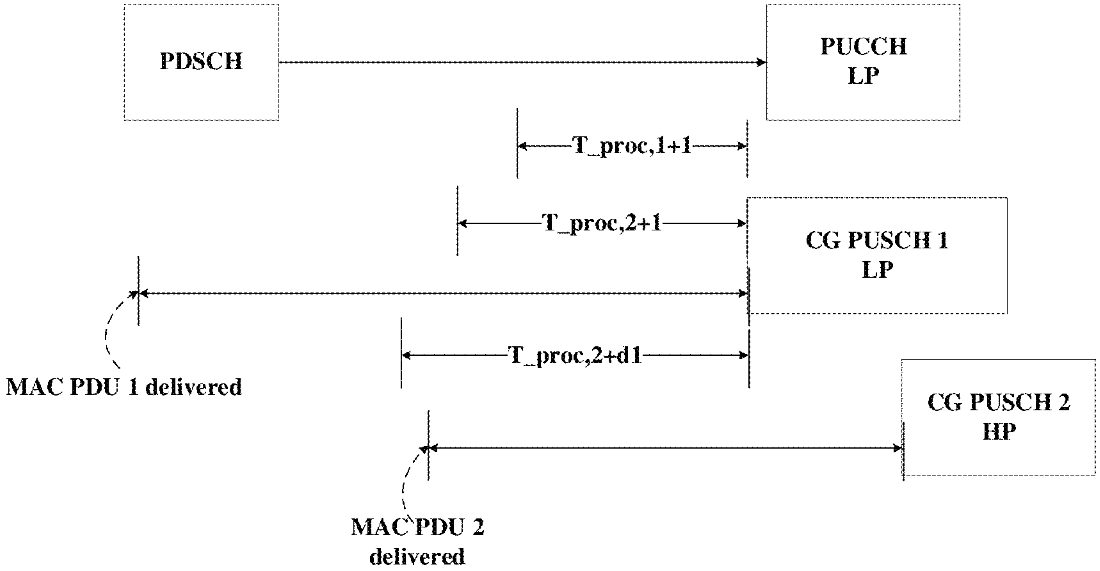
FIG. 38 to FIG. 41 are schematic diagrams of example 3c according to an embodiment of this application.

Example 3c: the LP PUCCH overlaps the LP CG PUSCH 1 in time, the CG PUSCH 1 overlaps the HP CG PUSCH 2 in time, and the LP PUCCH overlaps or does not overlap the HP CG PUSCH 2 in time. The time interval between the moment generated by the MAC PDU corresponding to the CG PUSCH 2 and the start moment of the CG PUSCH 1 is greater than or equal to $T_{proc,1}$+1 and greater than or equal to $T_{proc,2}$+1, and the time interval between the moment generated by the MAC PDU corresponding to the CG PUSCH 2 and the start moment of the CG PUSCH 1 is smaller than $T_{proc,2}$+d1 (FIG. 38).

Figure 39:
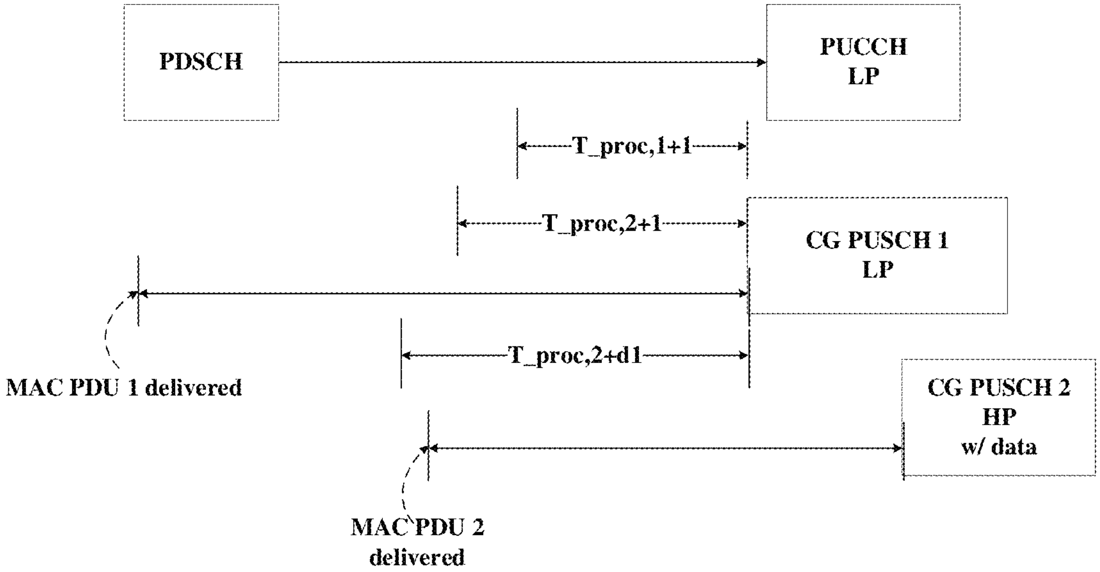

UE behavior 1: The UCI carried on the LP PUCCH cannot be multiplexed on the HP CG PUSCH 2 for transmission, that is, the UE only transmits data on the CG PUSCH 2 (FIG. 39).

Optionally, the UE cancels the (part of) transmission of the LP CG PUSCH 1 in a case that the CG PUSCH 1 overlaps the CG PUSCH 2.

Figure 40:
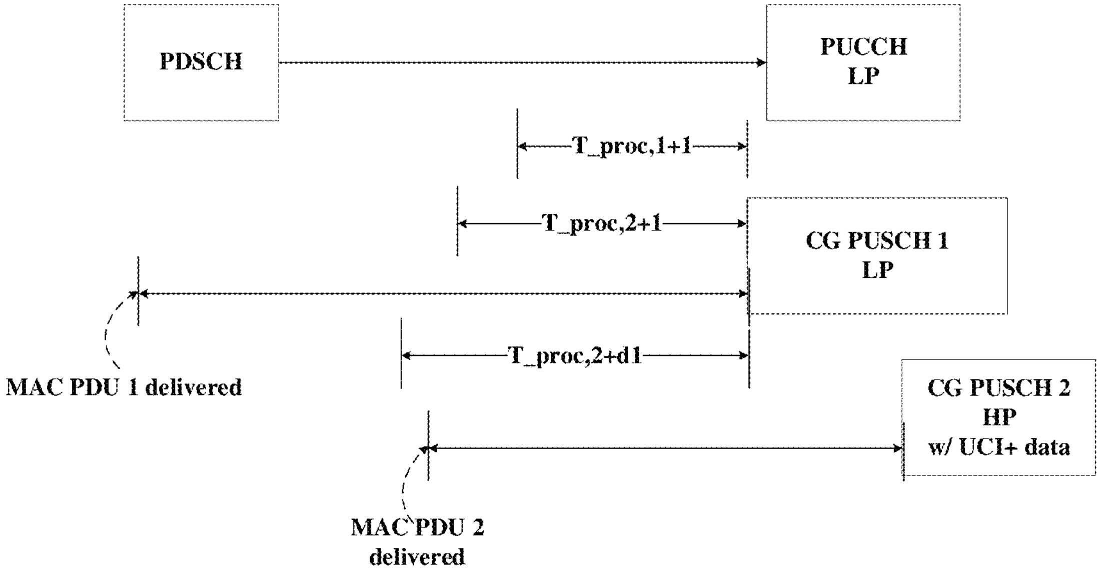

UE behavior 2: if the LP PUCCH overlaps the HP CG PUSCH 2 in time, the UCI carried on the LP PUCCH can be multiplexed on the HP CG PUSCH 2 for transmission (FIG. 40).

Optionally, the UE cancels the (part of) transmission of the LP CG PUSCH 1 in a case that the CG PUSCH 1 overlaps the CG PUSCH 2.

Figure 41:
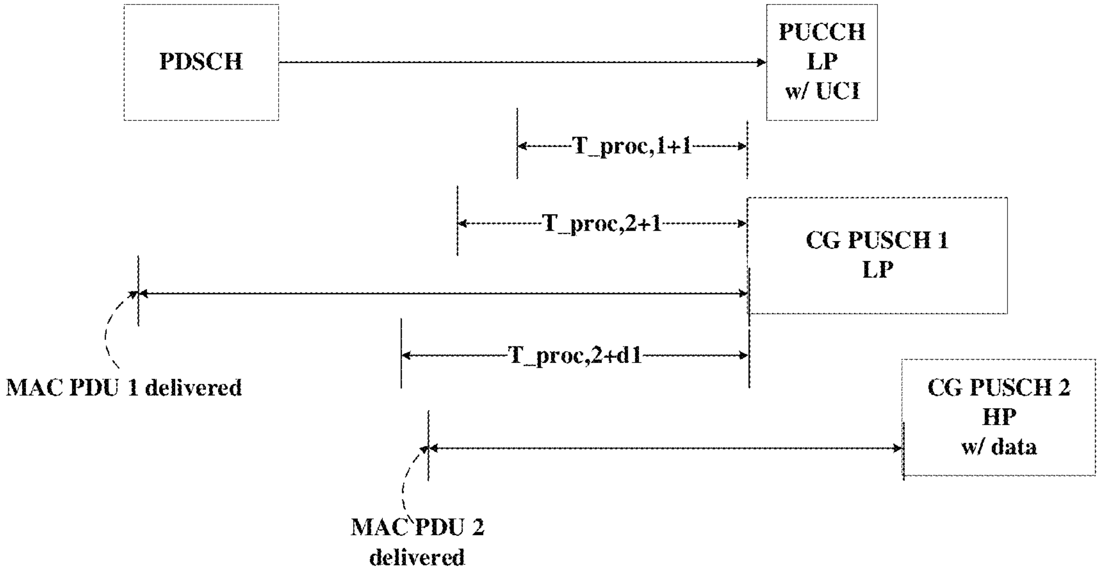

UE behavior 3: if the LP PUCCH does not overlap the HP CG PUSCH 2 in time, the UE transmits the LP PUCCH and the HP CG PUSCH 2 by time division multiplexing, and the UCI is carried on the PUCCH (FIG. 41).

Optionally, the UE cancels the (part of) transmission of the LP CG PUSCH 1 in a case that the CG PUSCH 1 overlaps the CG PUSCH 2.

Figure 42:
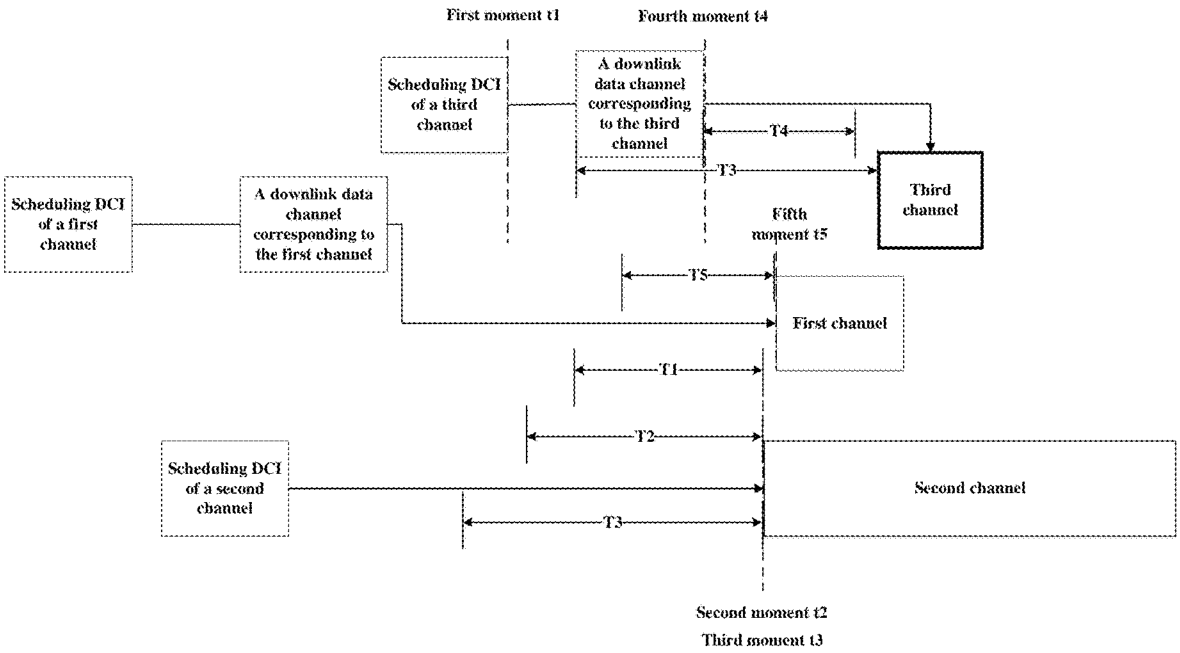
FIG. 42 is a schematic diagram of example 4 according to an embodiment of this application.

Example 4: referring to FIG. 42, the first channel is the LP PUCCH, the second channel is the HP PUCCH, and the third channel is the LP CG/DG PUSCH.

Figure 43:
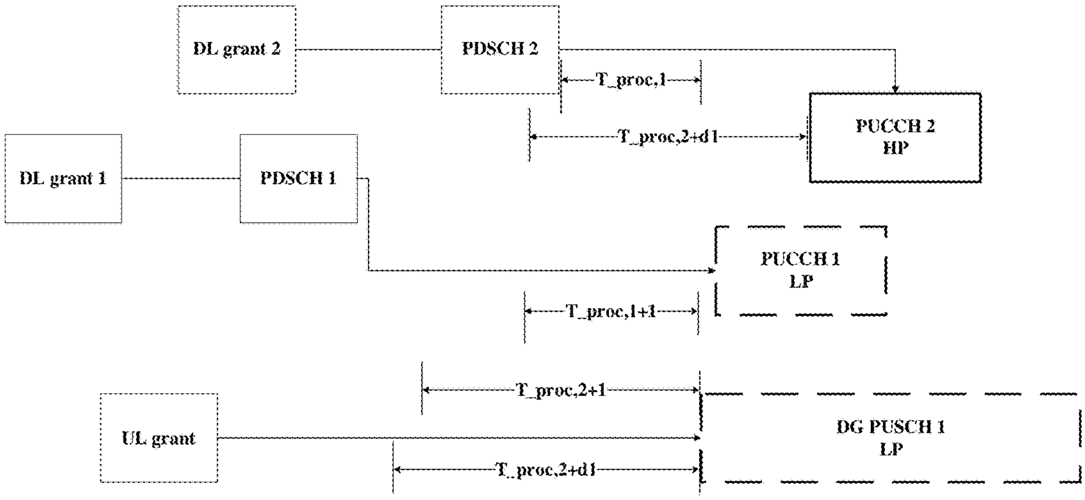
FIG. 43 to FIG. 45 are schematic diagrams of example 4a according to an embodiment of this application.

Example 4a: the LP PUCCH 1 overlaps the LP DG PUSCH 1 in time, the DG PUSCH 1 overlaps the HP PUCCH 2 in time, and the LP PUCCH 1 overlaps the HP PUCCH 2 in time. The time interval between the receiving moment of the DL grant corresponding to the PUCCH 2 and the start moment of the DG PUSCH 1 is greater than or equal to $T_{proc,1}$+1 and greater than or equal to $T_{proc,2}$+1, and the time interval between the receiving moment of the DL grant corresponding to the PUCCH 2 and the start moment of the DG PUSCH 1 is greater than or equal to $T_{proc,2}$+d1. Optionally, the time interval between the end moment of the PDSCH 2 corresponding to the PUCCH 2 and the start moment of the DG PUSCH 1 is greater than or equal to $T_{proc,1}$ (FIG. 43).

Figure 44:
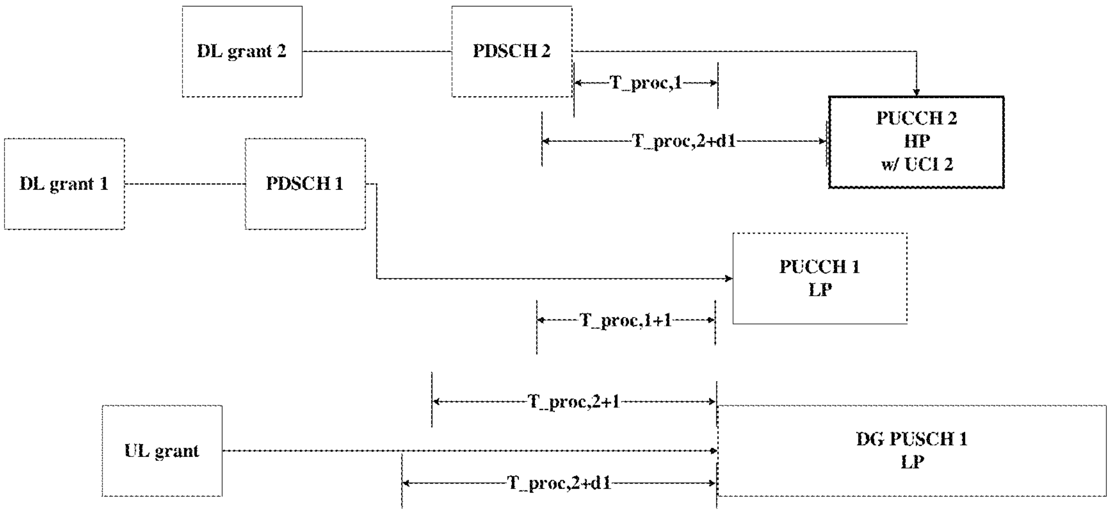

UE behavior 1: The UCI 1 carried on the LP PUCCH 1 can be multiplexed with the UCI 2 carried on the HP PUCCH 2 on the HP PUCCH 2 for transmission (FIG. 44).

Optionally, the UE cancels the transmission of the LP PUCCH 1.

Figure 45:
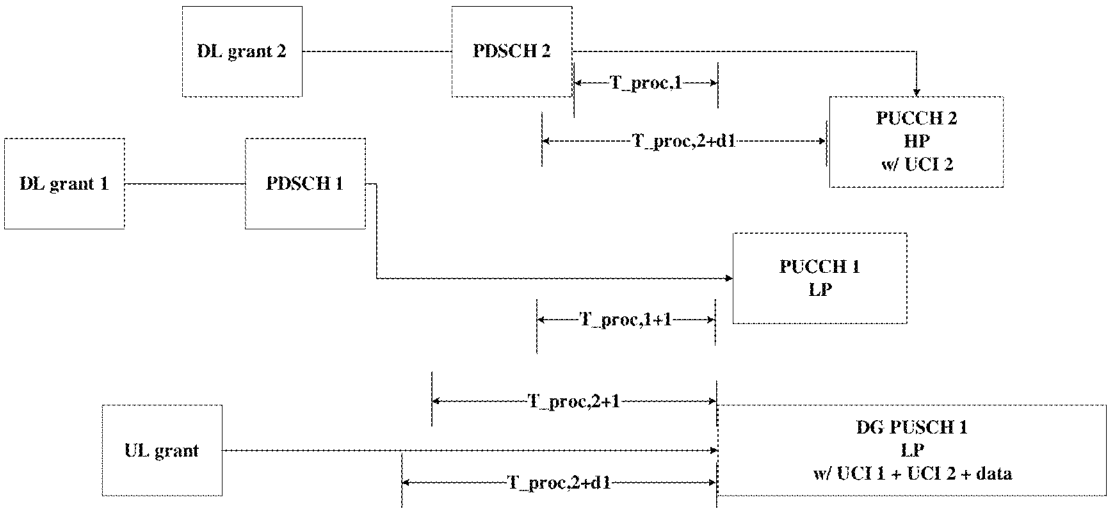

UE behavior 2: UCI 1 carried on the LP PUCCH 1 can be multiplexed with UCI 2 carried on the HP PUCCH 2 on the LP DG PUSCH 2 for transmission (FIG. 45).

Figure 46:
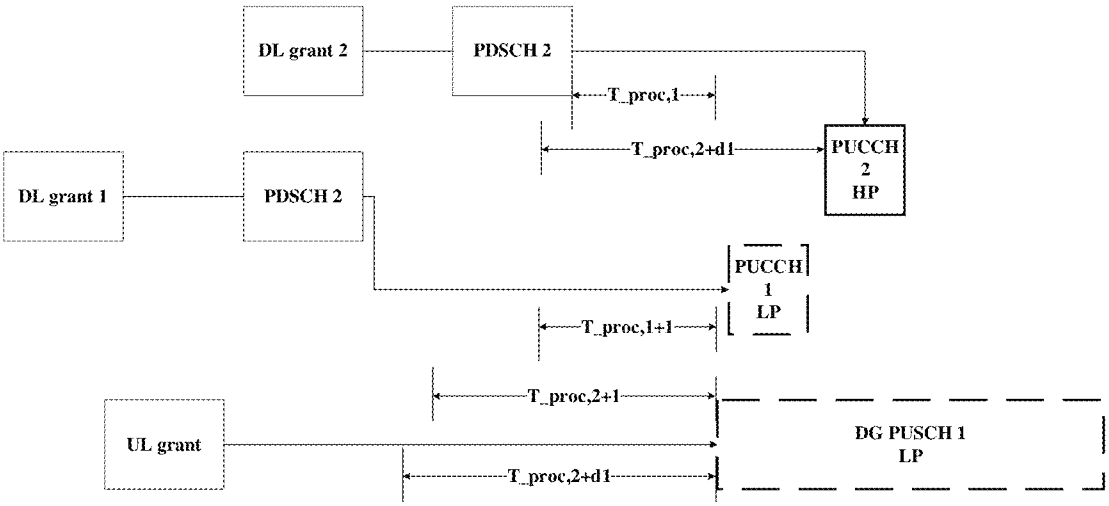
FIG. 46 to FIG. 48 are schematic diagrams of example 4a' according to an embodiment of this application.

Example 4a': the LP PUCCH 1 overlaps the LP DG PUSCH 1 in time, the DG PUSCH 1 overlaps the HP PUCCH 2 in time, and the LP PUCCH 1 does not overlap the HP PUCCH 2 in time. The time interval between the receiving moment of the DL grant corresponding to the PUCCH 2 and the start moment of the DG PUSCH 1 is greater than or equal to $T_{proc,1}$+1 and greater than or equal to $T_{proc,2}$+1, and the time interval between the receiving moment of the DL grant corresponding to the PUCCH 2 and the start moment of the DG PUSCH 1 is greater than or equal to $T_{proc,2}$+d1. Optionally, the time interval between the end moment of the PDSCH 2 corresponding to the PUCCH 2 and the start moment of the DG PUSCH 1 is greater than or equal to $T_{proc,1}$ (FIG. 46).

Figure 47:
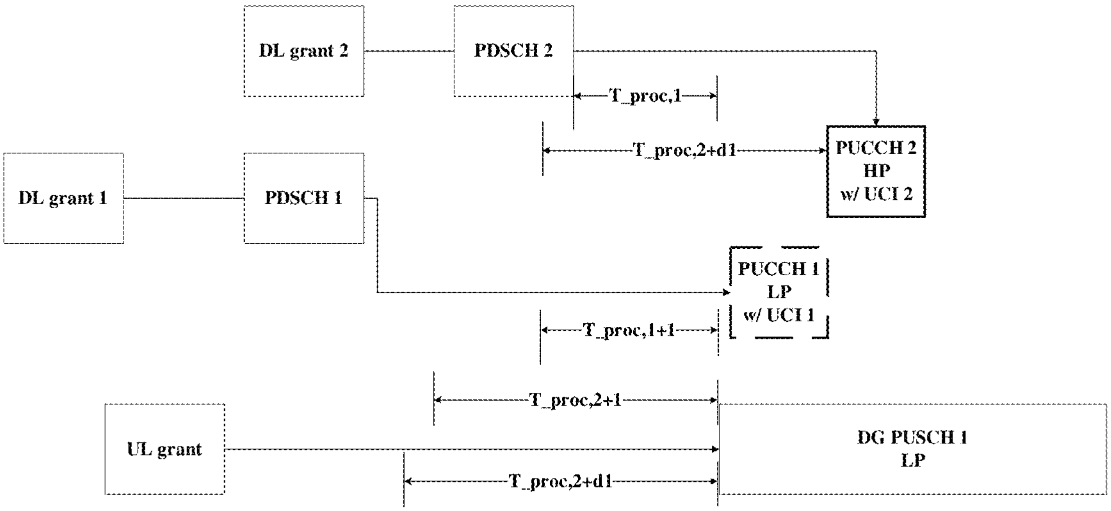

UE behavior 1: the UE transmits the LP PUCCH 1 and HP PUCCH 2 by time division multiplexing (FIG. 47).

Optionally, the UE cancels the transmission of the LP DG PUSCH 1.

Figure 48:
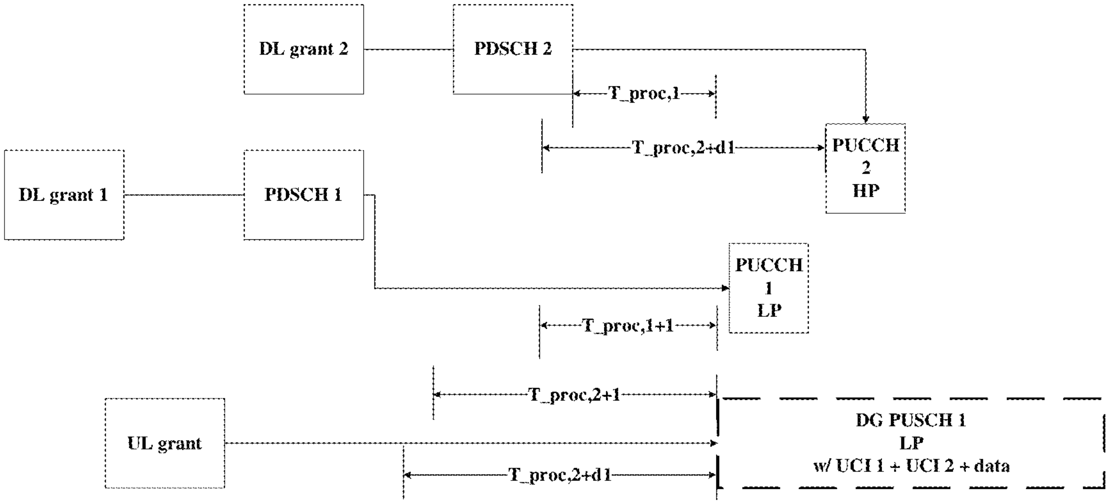

UE behavior 2: the UCI 1 carried on the LP PUCCH 1 can be multiplexed with the UCI 2 carried on the HP PUCCH 2 on the LP DG PUSCH 2 for transmission (FIG. 48).

Figure 49:
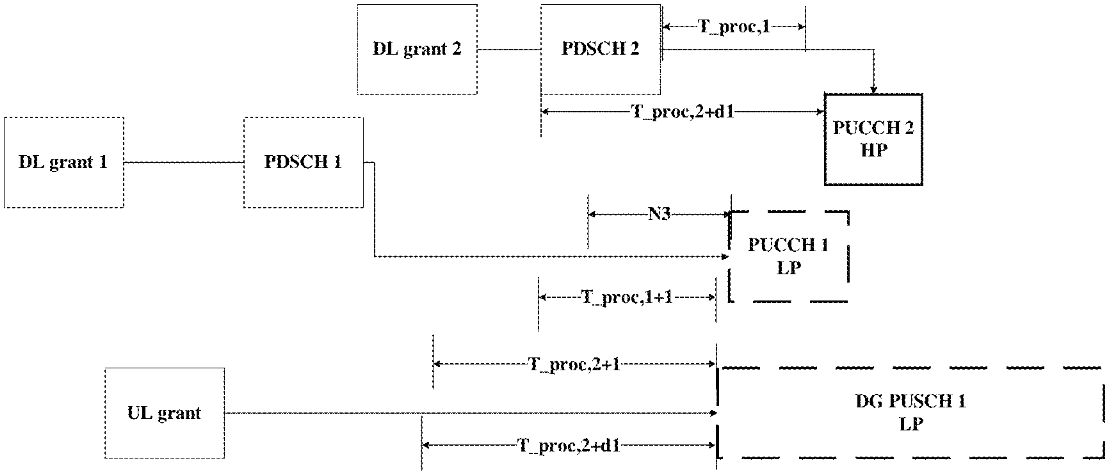
FIG. 49 to FIG. 52 are schematic diagrams of example 4b according to an embodiment of this application.

Example 4b: the LP PUCCH 1 overlaps the LP DG PUSCH 1 in time, the DG PUSCH 1 overlaps the HP PUCCH 2 in time, and the LP PUCCH 1 overlaps or does not overlap the HP PUCCH 2 in time. The time interval between the receiving moment of the DL grant corresponding to the PUCCH 2 and the start moment of the DG PUSCH 1 is smaller than $T_{proc,1}$+1 or $T_{proc,2}$+1, and the time interval between the receiving moment of the DL grant corresponding to the PUCCH 2 and the start moment of the DG PUSCH 1 is smaller than $T_{proc,2}$+d1. Optionally, the time interval between the receiving moment of the DL grant corresponding to the PUCCH 2 and the start moment of the PUCCH 1 is greater than or equal to $N_3$ (FIG. 49).

Figure 50:
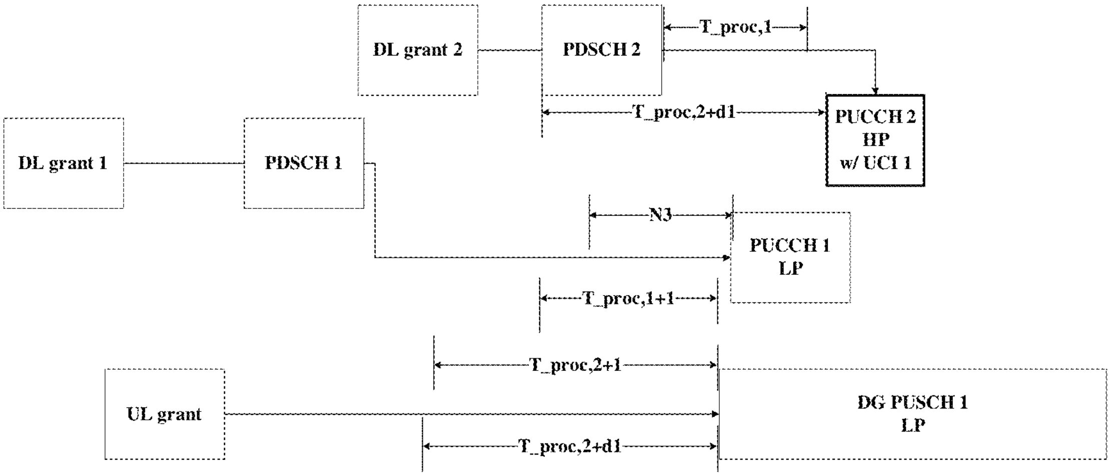

UE behavior 1: the UCI 1 carried on the LP PUCCH cannot be multiplexed with the UCI 2 carried on the HP PUCCH 2, that is, the UE only transmits the UCI 2 on the PUCCH 2 (FIG. 50).

Optionally, the UE cancels the (part of) transmission of the LP DG PUSCH 1 in a case that the DG PUSCH 1 overlaps the PUCCH 2.

Figure 51:
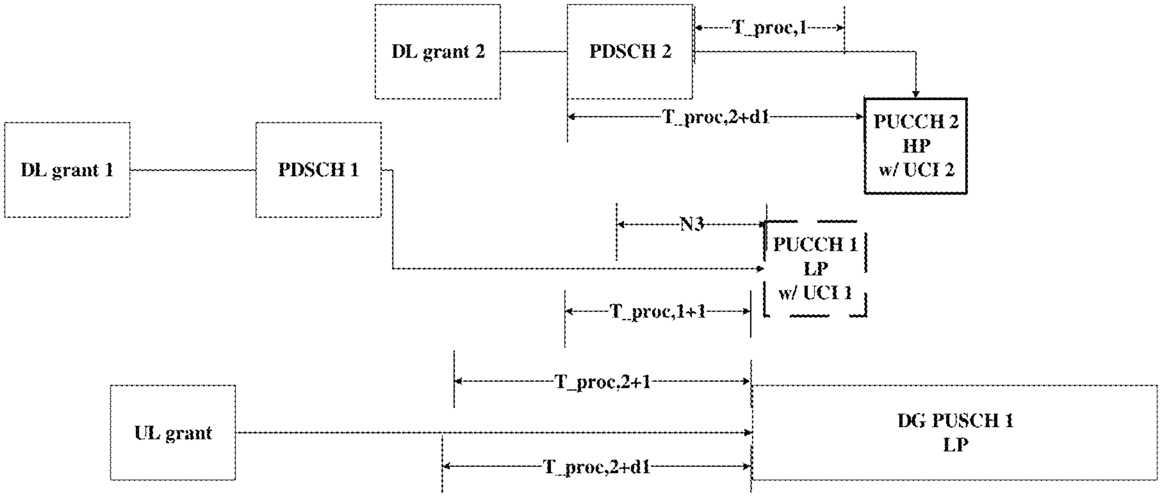

UE behavior 2: if the LP PUCCH 1 does not overlap the HP PUCCH 2 in time, the UE transmits the LP PUCCH 1 and the HP PUCCH 2 by time division multiplexing (FIG. 51).

Optionally, the UE cancels the (part of) transmission of the LP DG PUSCH 1 in a case that the DG PUSCH 1 overlaps the PUCCH 2.

Figure 52:
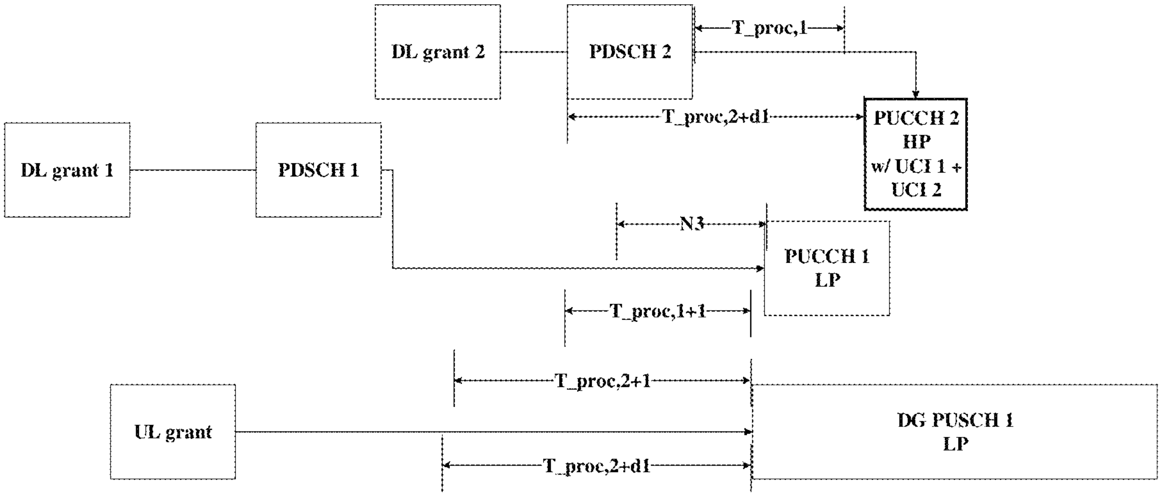

UE behavior 3: if the LP PUCCH 1 overlaps the HP PUCCH 2 in time, the UCI 1 carried on the LP PUCCH 1 can be multiplexed with the UCI 2 carried on the HP PUCCH 2 on the HP PUCCH 2 for transmission (FIG. 52).

Optionally, the UE cancels the (part of) transmission of the LP DG PUSCH 1 in a case that the DG PUSCH 1 overlaps the PUCCH 2.

Figure 53:
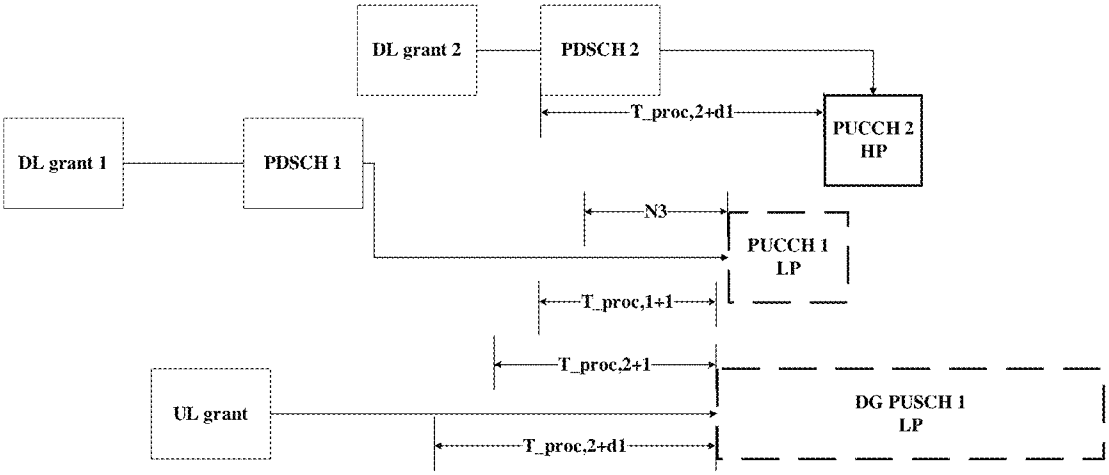
FIG. 53 to FIG. 56 are schematic diagrams of example 4c according to an embodiment of this application.

Example 4c: the LP PUCCH 1 overlaps the LP DG PUSCH 1 in time, the DG PUSCH 1 overlaps the HP PUCCH 2 in time, and the LP PUCCH 1 overlaps the HP PUCCH 2 in time. The time interval between the receiving moment of the DL grant corresponding to the PUCCH 2 and the start moment of the DG PUSCH 1 is greater than or equal to $T_{proc,1}+1$ and greater than or equal to $T_{proc,2}+1$, and the time interval between the receiving moment of the DL grant corresponding to the PUCCH 2 and the start moment of the DG PUSCH 1 is smaller than $T_{proc,2}+d1$. Optionally, the time interval between the receiving moment of the DL grant corresponding to the PUCCH 2 and the start moment of the PUCCH 1 is greater than or equal to $N_3$ (FIG. 53).

Figure 54:
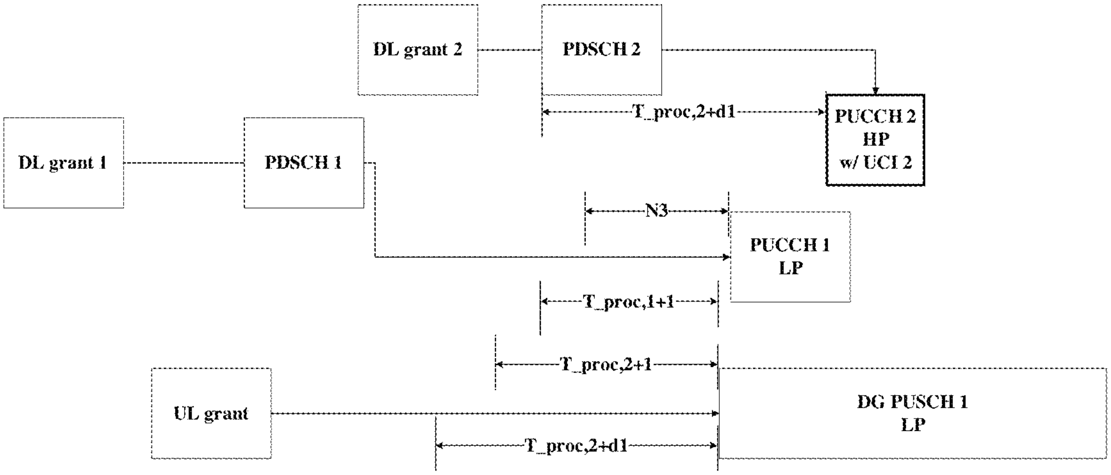

UE behavior 1: the UCI 1 carried on the LP PUCCH cannot be multiplexed with the UCI 2 carried on the HP PUCCH 2, that is, the UE only transmits the UCI 2 on the PUCCH 2 (FIG. 54).

Optionally, the UE cancels the (part of) transmission of the LP DG PUSCH 1 in a case that the DG PUSCH 1 overlaps the PUCCH 2.

Figure 55:
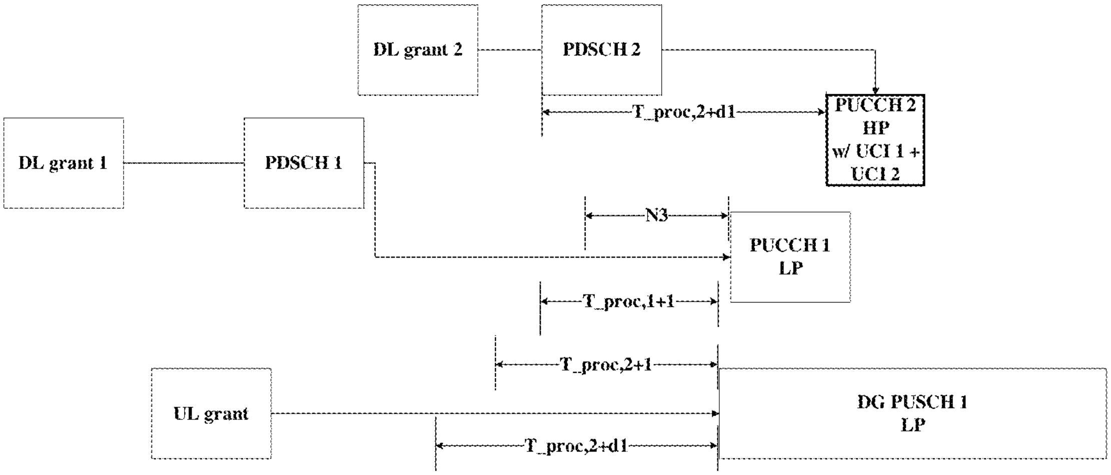

UE behavior 2: if the LP PUCCH overlaps the HP PUCCH 2 in time, the UCI 1 carried on the LP PUCCH 1 can be multiplexed with the UCI 2 carried on the HP PUCCH 2 (FIG. 55).

Optionally, the UCI 1 and the UCI 2 are transmitted on the HP PUCCH 2.

Optionally, the UE cancels the (part of) transmission of the LP DG PUSCH 1 in a case that the DG PUSCH 1 overlaps the PUCCH 2.

Figure 56:
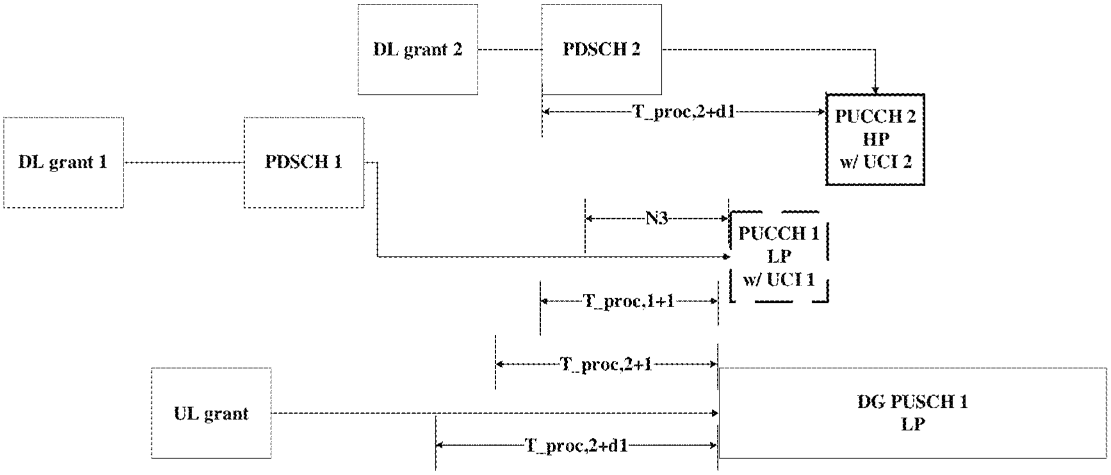

UE behavior 3: if the LP PUCCH 1 does not overlap the HP PUCCH 2 in time, the UE transmits the LP PUCCH 1 and the HP PUCCH 2 by time division multiplexing (FIG. 56).

Optionally, the UE cancels the (part of) transmission of the LP DG PUSCH 1 in a case that the DG PUSCH 1 overlaps the PUCCH 2.

Figure 57:
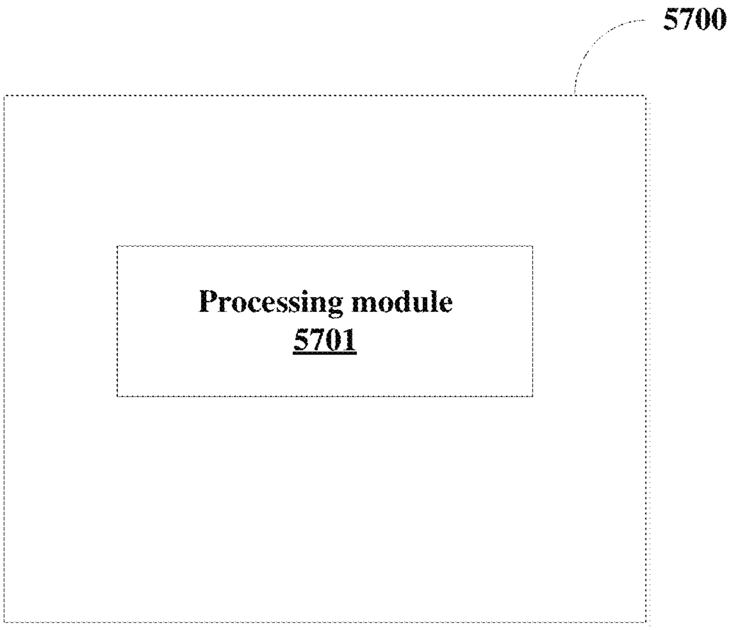
FIG. 57 is a schematic diagram of an uplink transmission apparatus according to an embodiment of this application.

Referring to FIG. 57, an embodiment of this application provides an uplink transmission apparatus. The apparatus 5700 includes: a processing module 5701, configured to, in a case that a first channel overlaps a second channel in time, the second channel overlaps a third channel in time, and a priority corresponding to the third channel is higher than a priority corresponding to the first channel and a priority corresponding to the second channel, perform a first operation.

The first operation includes: multiplexing first uplink control information on the third channel for transmission; or not multiplexing the first uplink control information on the third channel for transmission.

The first uplink control information is uplink control information carried on the first channel.

In an embodiment of this application, the performing a first operation includes: in a case that a first condition is met, performing the first operation.

The first condition includes one or more of:

an interval between a first moment and a second moment is greater than or equal to a first time;

the interval between the first moment and the second moment is smaller than a second time;

an interval between the first moment and a third moment is greater than or equal to a third time;

the interval between the first moment and the third moment is smaller than a fourth time;

an interval between the first moment and a fourth moment is greater than or equal to a fifth time; or an interval between a fifth moment and the second moment is greater than or equal to a sixth time.

The first moment is a receiving moment of a downlink control channel corresponding to the third channel, or a generation moment of a MAC PDU corresponding to the third channel.

The second moment is a start moment of the first channel or a start moment of the second channel.

The third moment is a start moment of the second channel.

The fourth moment is a receiving moment of a downlink data channel corresponding to the first channel.

The fifth moment is the start moment of the first channel.

In an embodiment of this application, the first time or the second time includes: a first processing time and/or a second processing time.

The third time or the fourth time includes: a third processing time.

The fifth time includes: a fourth processing time.

The sixth time includes: a fifth processing time.

The first processing time, the second processing time, the third processing time, the fourth processing time, and/or the fifth processing time include any one of:

a processing time of a physical downlink shared channel;

a preparation time of a physical uplink shared channel;

a cancellation time of uplink transmission;

a first multiplexing time;

a second multiplexing time; or a preparation time of a physical uplink control channel.

In an embodiment of this application, the first operation further includes: not expecting to meet or not meeting the first condition.

In an embodiment of this application, the first channel overlaps or does not overlap the third channel in time.

In an embodiment of this application, not multiplexing the first uplink control information on the third channel for transmission includes:

discarding the first uplink control information;

or transmitting the first uplink control information on the first channel;

or transmitting the first uplink control information on the second channel.

In an embodiment of this application, the second channel is a dynamic grant physical uplink shared control channel, or a configured grant physical uplink shared control channel. The third channel is a dynamic grant physical uplink shared control channel, a configured grant physical uplink shared control channel, or a physical uplink control channel.

In an embodiment of this application, the transmitting the first uplink control information on the second channel includes: in a case that the third channel is a dynamic grant physical uplink shared control channel, transmitting the first uplink control information and second uplink control information on the second channel, where the second uplink control information is uplink control information carried on the dynamic grant physical uplink shared control channel.

In an embodiment of this application, in a case that the third channel is a dynamic grant physical uplink shared control channel, uplink control information carried on the dynamic grant physical uplink shared control channel is transmitted on the third channel.

In an embodiment of this application, the first operation further includes one or more of:

canceling all or part of the transmission on the second channel, or transmitting the second channel; or canceling all or part of the transmission on the first channel, or transmitting the first channel.

In an embodiment of this application, the canceling all or part of the transmission on the second channel includes: starting from a moment at which the second channel overlaps the third channel, canceling all or part of the transmission of the second channel.

The apparatus provided in this embodiment of this application can implement the processes implemented in the method embodiments in FIG. 5, with the same technical effect achieved. To avoid repetition, details are not described herein again.

Figure 58:
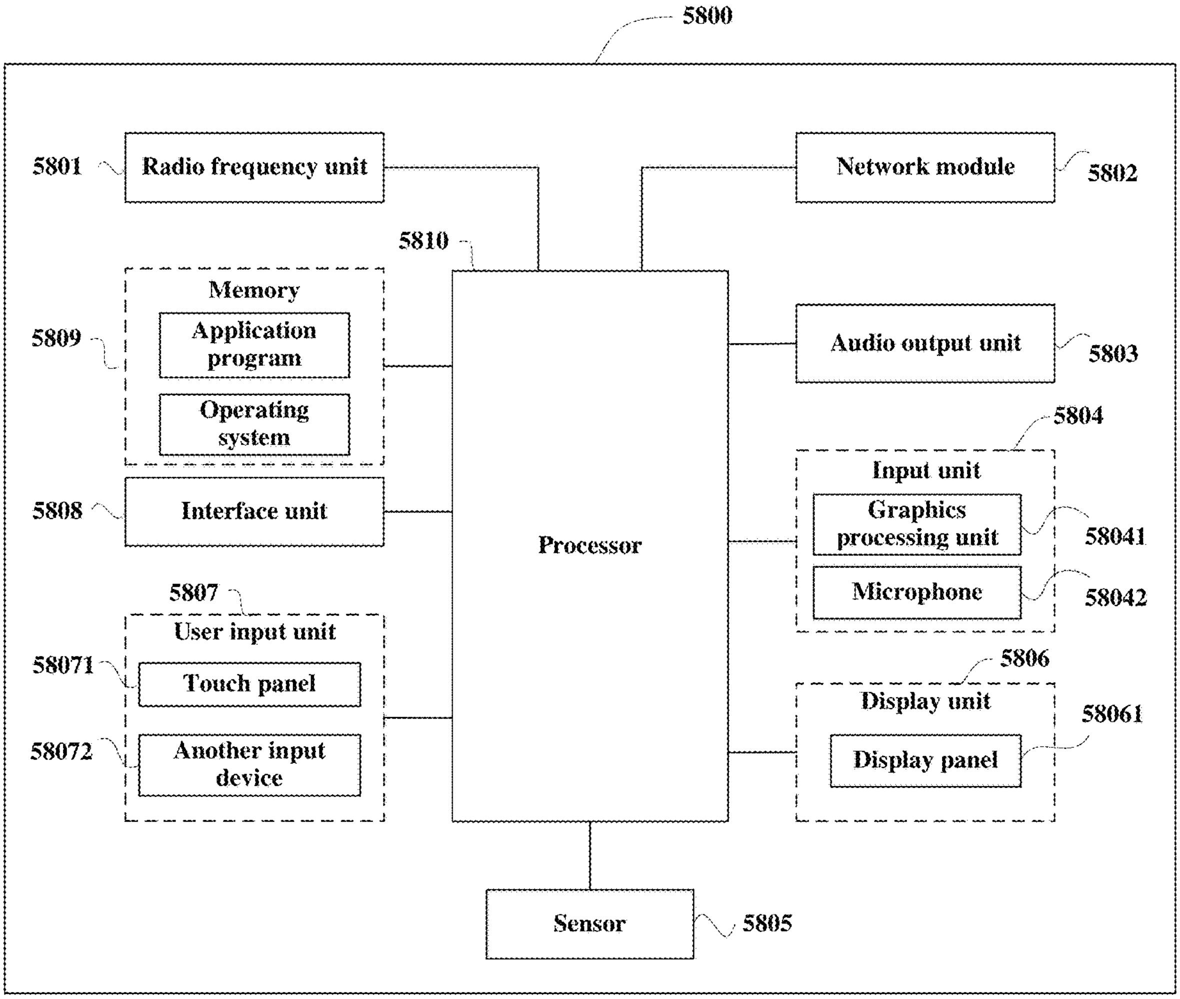
FIG. 58 is a schematic diagram of a terminal according to an embodiment of this application.

FIG. 58 is a schematic diagram of a hardware structure of a terminal according to an embodiment of this application.

The terminal 5800 includes but is not limited to components such as a radio frequency unit 5801, a network module 5802, an audio output unit 5803, an input unit 5804, a sensor 5805, a display unit 5806, a user input unit 5807, an interface unit 5808, a memory 5809, and a processor 5810.

A person skilled in the art can understand that the terminal 5800 may further include a power supply (for example, a battery) that supplies power to the components. The power supply may be logically connected to the processor 5810 by using a power management system, so as to implement functions such as charging management, discharging management, and power consumption management by using the power management system. The terminal structure shown in FIG. 58 constitutes no limitation on the terminal, and the terminal may include more or fewer components than those shown in the figure, or combine some components, or have different component arrangements. Details are not described herein.

It should be understood that, in the embodiments of this application, the input unit 5804 may include a graphics processing unit (GPU) 58041 and a microphone 58042, and the graphics processing unit 58041 processes image data of a still picture or video obtained by an image capture apparatus (such as a camera) in a video capture mode or an image capture mode. The display unit 5806 may include a display panel 58061, and the display panel 58061 may be configured in a form of a liquid crystal display, an organic light-emitting diode, or the like. The user input unit 5807 includes a touch panel 58071 and another input device 58072. The touch panel 58071 is also referred to as a touchscreen. The touch panel 58071 may include two parts: a touch detection apparatus and a touch controller.

The another input device 58072 may include but is not limited to a physical keyboard, a functional button (such as a volume control button or a power on/off button), a trackball, a mouse, and a joystick. Details are not described herein.

In this embodiment of this application, the radio frequency unit 5801 receives downlink data from a network side device and then sends the downlink data to the processor 5810 for processing; and sends uplink data to the network-side device. Usually, the radio frequency unit 5801 includes but is not limited to an antenna, at least one amplifier, a transceiver, a coupler, a low noise amplifier, a duplexer, and the like.

The memory 5809 may be configured to store a software program or an instruction and various data. The memory 5809 may mainly include a program or instruction storage area and a data storage area. The program or instruction storage area may store an operating system, and an application or an instruction required by at least one function (for example, a sound playing function or an image playing function). In addition, the memory 5809 may include a high-speed random access memory, or may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 5810 may include one or more processing units. Optionally, an application processor and a modem processor may be integrated into the processor 5810. The application processor mainly processes an operating system, a user interface, an application, an instruction, or the like. The modem processor mainly processes wireless communications, for example, a baseband processor. It can be understood that, alternatively, the modem processor may not be integrated into the processor 5810.

The terminal provided in this embodiment of this application can implement the processes implemented in the method embodiments in FIG. 5. To avoid repetition, details are not described herein again.

An embodiment of this application further provides a program product. The program product is stored in a non-volatile storage medium, and the program product is executed by at least one processor, to implement the steps of the processing method in FIG. 5.

An embodiment of this application further provides a non-transitory computer-readable storage medium. The non-transitory computer-readable storage medium stores a program or an instruction. When the program or the instruction is executed by a processor, the processes in the foregoing method embodiments in FIG. 5 are implemented, and the same technical effect can be achieved. To avoid repetition, details are not described herein again.

The processor is a processor in the terminal in the above embodiment. The non-transitory computer-readable storage medium includes a computer read-only memory (ROM), a random access memory (RAM), a magnetic disk, or an optical disc.

An embodiment of this application further provides a chip. The chip includes a processor and a communications interface, and the communications interface is coupled to the processor. The processor is configured to execute a program or an instruction of a network device, to implement various processes of the foregoing method embodiments in FIG. 2, with the same technical effects achieved. To avoid repetition, details are not described herein again.

It should be understood that the chip mentioned in this embodiment of the present application may also be referred to as a system-level chip, a system chip, a system on chip, a system chip on chip, and the like.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without further restrictions, the element defined by the statement “including a . . . ” does not exclude the existence of another identical element in the process, method, article or apparatus including the element.

In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. An uplink transmission method, comprising:

in a case that a first channel overlaps a second channel in a time, the second channel overlaps a third channel in a time, and a priority corresponding to the third channel is higher than a priority corresponding to the first channel and a priority corresponding to the second channel, performing a first operation by a terminal;

wherein the first operation comprises canceling transmission on the second channel and multiplexing first uplink control information on the third channel for transmission;

wherein the first uplink control information is uplink control information carried on the first channel, wherein the performing the first operation by the terminal comprises performing the first operation by the terminal in a case that a first condition is met;

wherein the first condition comprises an interval between a first moment and a second moment being greater than or equal to a first time; and wherein the first moment is a receiving moment of a downlink control channel corresponding to the third channel and the second moment is a start moment of the second channel.

2. The method according to claim 1, wherein the first time comprises: a first processing time and/or a second processing time; and wherein the first processing time and/or the second processing time, comprise any one of:

a first multiplexing time; or a second multiplexing time.

3. The method according to claim 1, wherein the first channel overlaps or does not overlap the third channel in a time.

4. The method according to claim 1, wherein canceling the transmission on the second channel comprises:

canceling all or part of the transmission on the second channel.

5. The method according to claim 4, wherein the canceling all or part of the transmission on the second channel comprises:

starting from a moment at which the second channel overlaps the third channel, canceling all or part of the transmission of the second channel.

6. A terminal, comprising a memory, a processor, and a program stored in the memory and executable on the processor, wherein the program, when executed by the processor, causes the terminal to perform:

in a case that a first channel overlaps a second channel in a time, the second channel overlaps a third channel in a time, and a priority corresponding to the third channel is higher than a priority corresponding to the first channel and a priority corresponding to the second channel, performing a first operation;

wherein the first operation comprises canceling transmission on the second channel, and multiplexing first uplink control information on the third channel for transmission;

wherein the first uplink control information is uplink control information carried on the first channel, wherein to perform the first operation, the terminal is configured to perform the first operation in a case that a first condition is met;

wherein the first condition comprises an interval between a first moment and a second moment being greater than or equal to a first time; and wherein the first moment is a receiving moment of a downlink control channel corresponding to the third channel and the second moment is a start moment of the second channel.

7. The terminal according to claim 6, wherein the first time comprises: a first processing time and/or a second processing time; and wherein the first processing time and/or the second processing time, comprise any one of:

a first multiplexing time; or a second multiplexing time.

8. The terminal according to claim 6, wherein canceling the transmission on the second channel comprises:

canceling all or part of the transmission on the second channel.

9. The terminal according to claim 8, wherein the canceling all or part of the transmission on the second channel comprises:

starting from a moment at which the second channel overlaps the third channel, canceling all or part of the transmission of the second channel.

10. A non-transitory computer-readable storage medium, wherein the non-transitory computer-readable storage medium stores a program or an instruction, and the program or the instruction, when executed by a processor, causes the processor to perform:

in a case that a first channel overlaps a second channel in a time, the second channel overlaps a third channel in a time, and a priority corresponding to the third channel is higher than a priority corresponding to the first channel and a priority corresponding to the second channel, performing a first operation;

wherein the first operation comprises canceling transmission on the second channel and multiplexing first uplink control information on the third channel for transmission;

wherein the first uplink control information is uplink control information carried on the first channel, wherein to perform the first operation, the program or the instruction, when executed by the processor, cause the processor to perform the first operation in a case that a first condition is met;

wherein the first condition comprises an interval between a first moment and a second moment being greater than or equal to a first time; and wherein the first moment is a receiving moment of a downlink control channel corresponding to the third channel and the second moment is a start moment of the second channel.

11. The non-transitory computer-readable storage medium according to claim 10, wherein:

the first time comprises a first processing time and/or a second processing time; and the first processing time and/or the second processing time comprise any one of:

a first multiplexing time; or a second multiplexing time.

* * * * *